(12) United States Patent
Wan et al.

(10) Patent No.: US 12,287,974 B2
(45) Date of Patent: Apr. 29, 2025

(54) ADAPTIVE SINGLE-SIDE ERASE TO IMPROVE CELL RELIABILITY

(71) Applicant: Western Digital Technologies, Inc., San Jose, CA (US)

(72) Inventors: Zhenni Wan, San Jose, CA (US); Bo Lei, San Jose, CA (US)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/229,390

(22) Filed: Aug. 2, 2023

(65) Prior Publication Data

US 2024/0385755 A1 Nov. 21, 2024

Related U.S. Application Data

(60) Provisional application No. 63/467,732, filed on May 19, 2023.

(51) Int. Cl.
G06F 3/06 (2006.01)

(52) U.S. Cl.
CPC .......... *G06F 3/0619* (2013.01); *G06F 3/0659* (2013.01); *G06F 3/0679* (2013.01)

(58) Field of Classification Search
CPC ..... G06F 3/0619; G06F 3/0659; G06F 3/0679
USPC .......................................... 711/103
See application file for complete search history.

(56) References Cited

U.S. PATENT DOCUMENTS

| 2017/0140833 | A1* | 5/2017 | Caillat | G11C 16/08 |
| 2022/0383963 | A1* | 12/2022 | Prakash | G11C 16/0483 |
| 2023/0117364 | A1* | 4/2023 | Prakash | G11C 16/3445 |
| | | | | 365/185.22 |

* cited by examiner

Primary Examiner — Than Nguyen
(74) Attorney, Agent, or Firm — Steven C. Hurles; Dickinson Wright PLLC

(57) ABSTRACT

A memory device includes control circuitry configured to perform an erase operation to erase memory cells of a memory block and perform an erase verify operation to verify whether the memory cells were sufficiently erased. To perform the erase operation, the control circuitry is configured to supply a first erase voltage pulse, perform the erase verify operation subsequent to supplying the first erase voltage pulse, subsequent to the erase verify operation, supply a first bias voltage to a first one of a plurality of memory strings and a second bias voltage different than the first bias voltage to a second one of a plurality of memory strings, and, while supplying the first and second bias voltages, supply a second erase voltage pulse. The second bias voltage is configured to inhibit the second erase voltage pulse supplied to the memory cells of the second one of the plurality of memory strings.

18 Claims, 16 Drawing Sheets

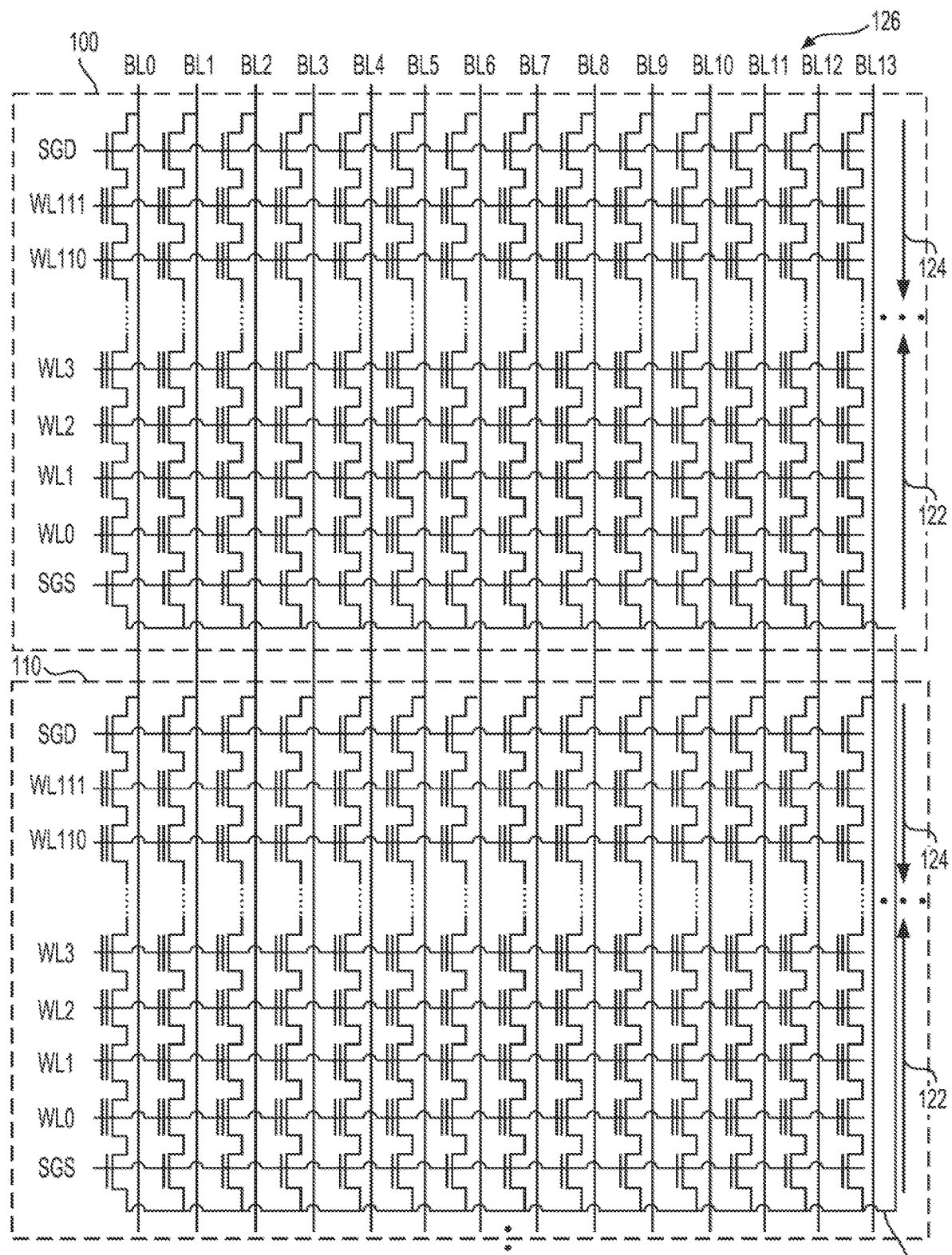
*FIG. 1 – Prior Art*

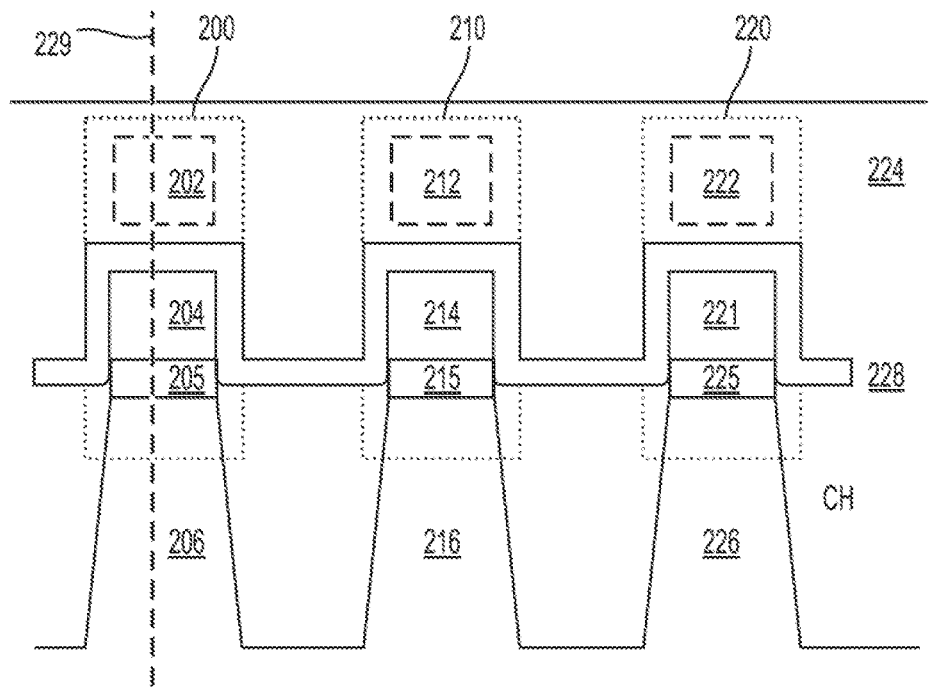
FIG. 2A - Prior Art
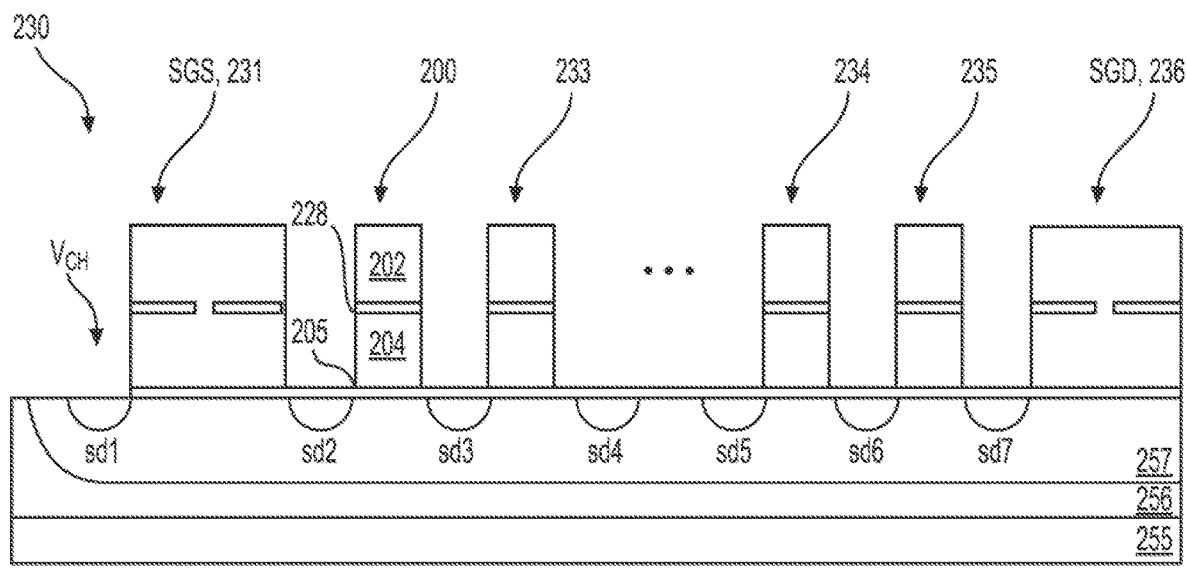
FIG. 2B – Prior Art

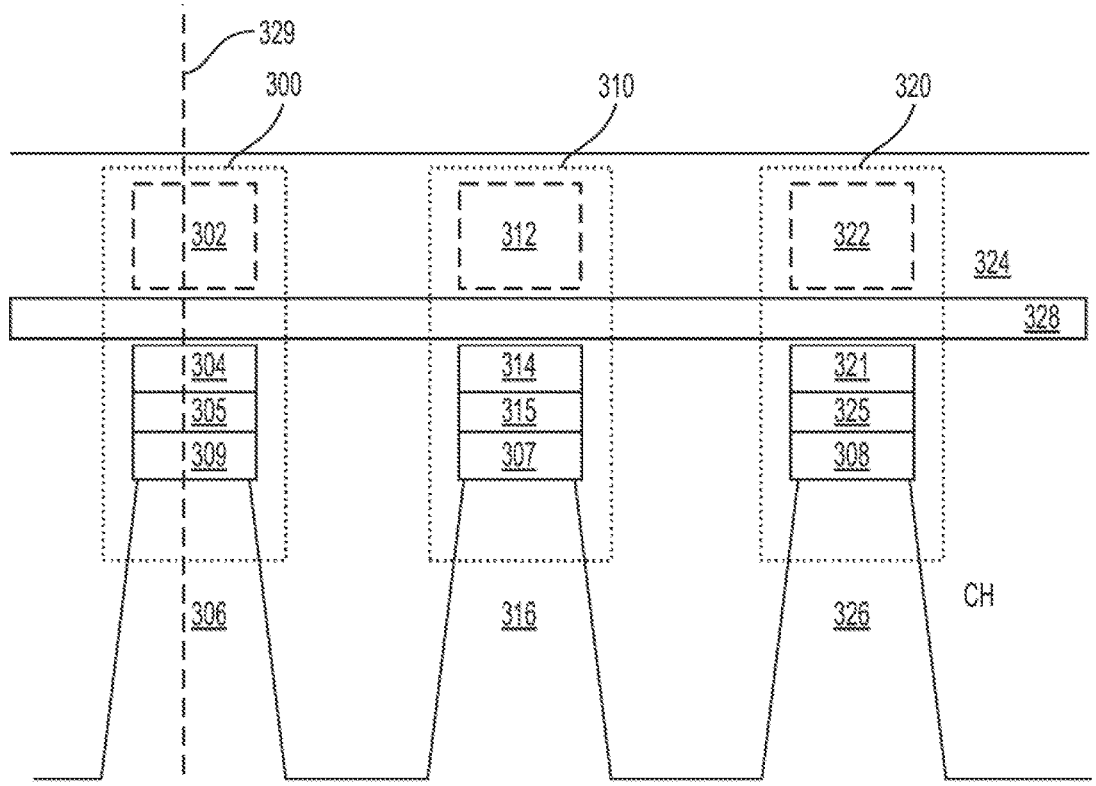
FIG. 3A – Prior Art
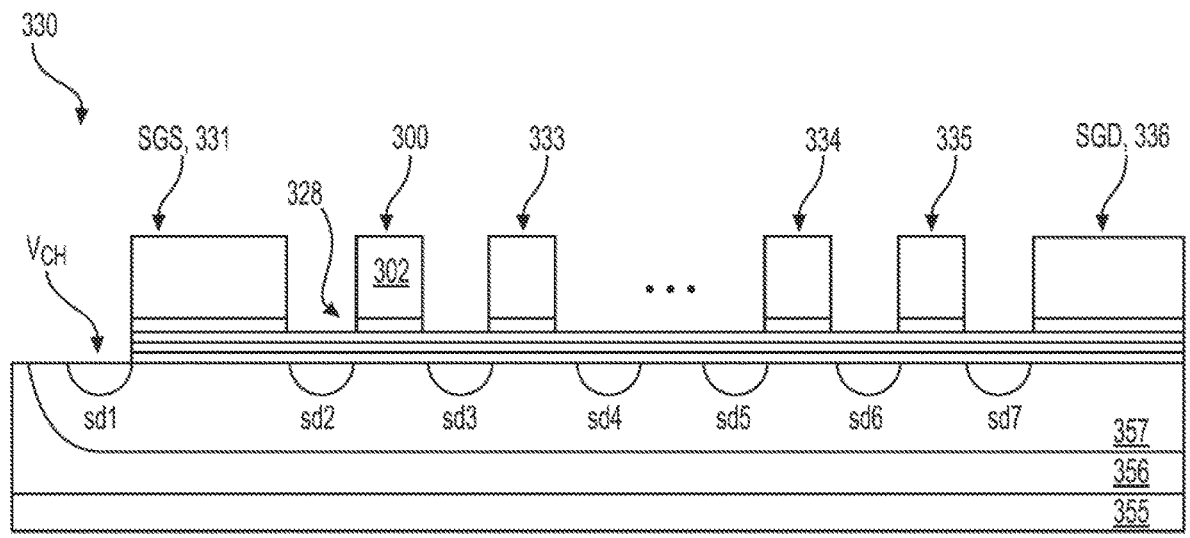
FIG. 3B – Prior Art

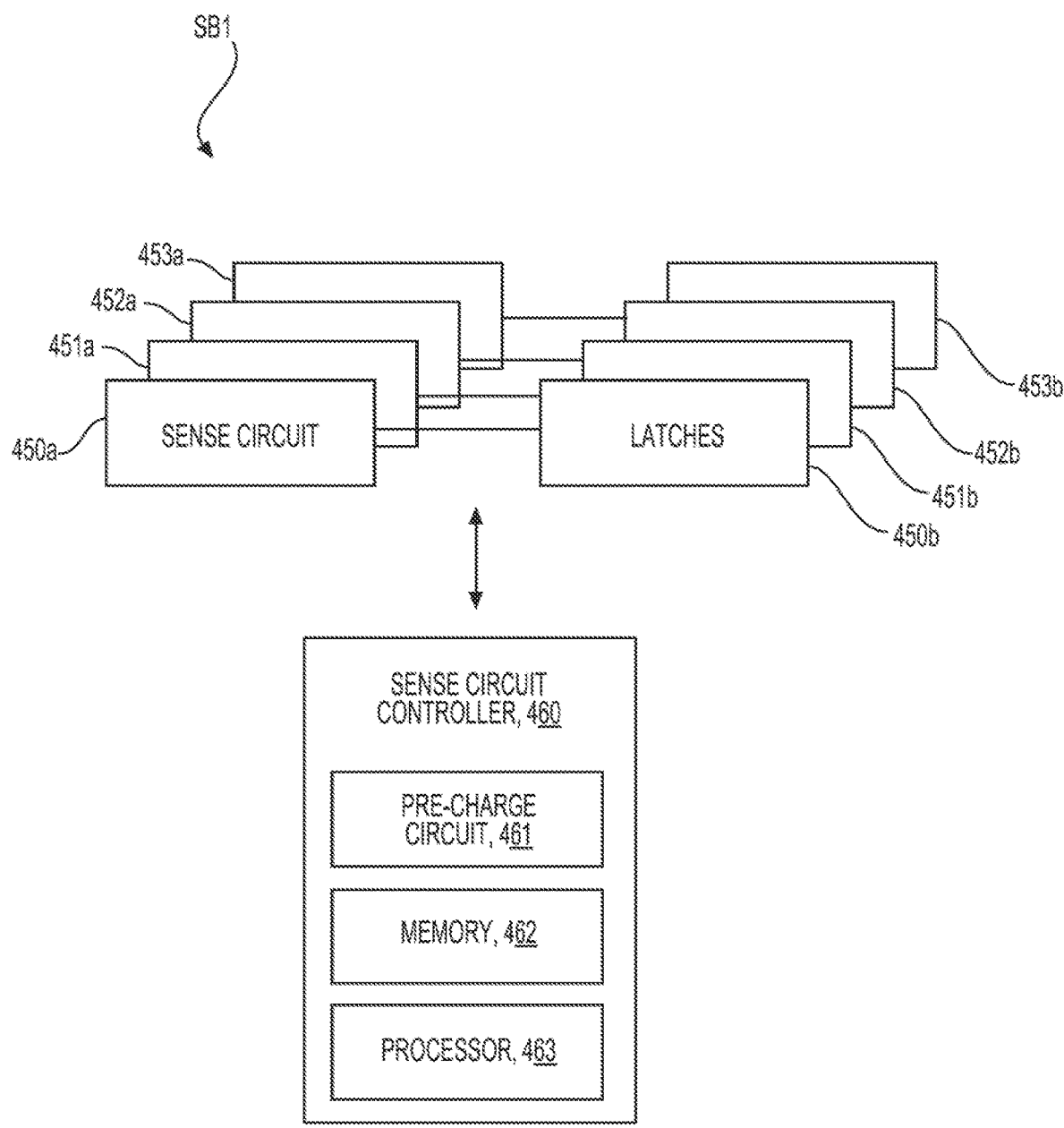
FIG. 4 – Prior Art

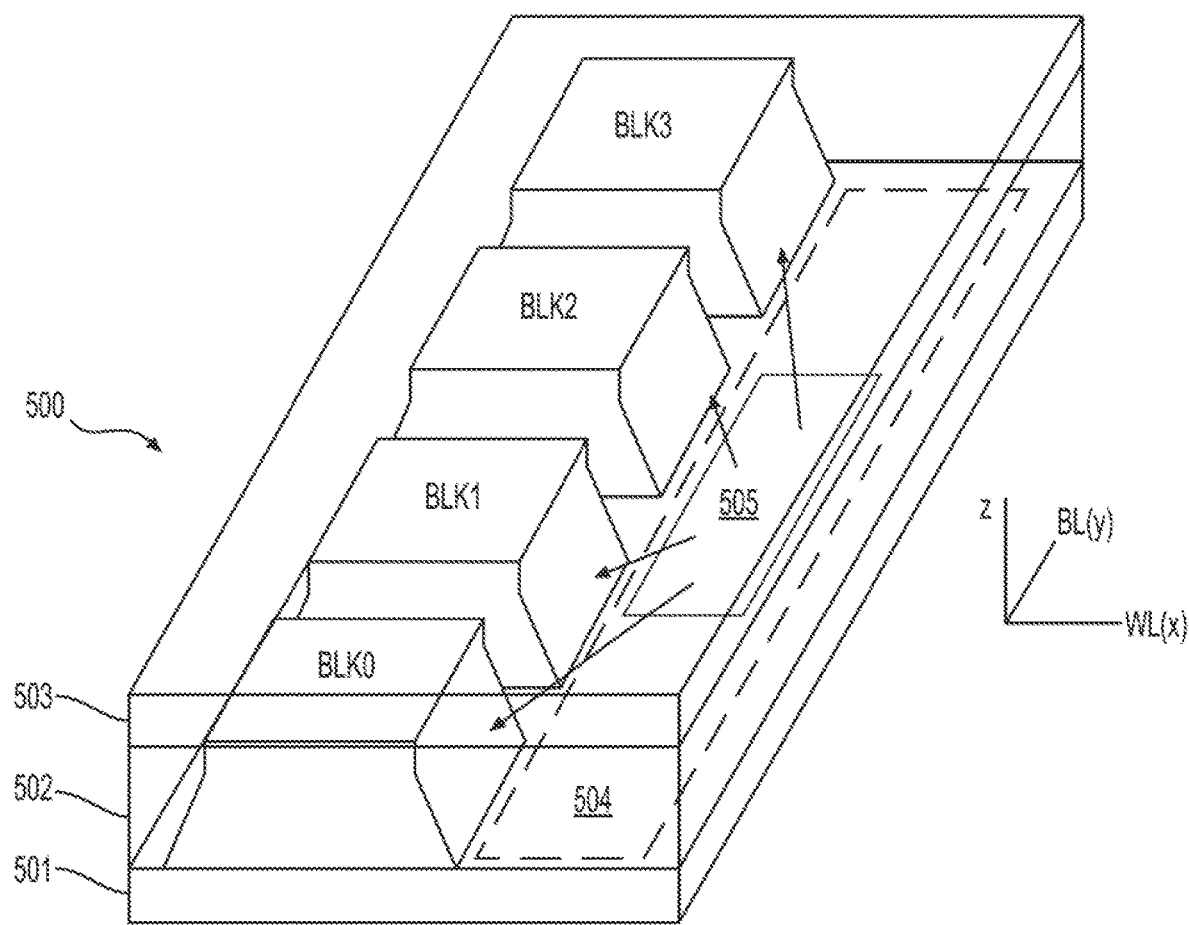
FIG. 5A – Prior Art

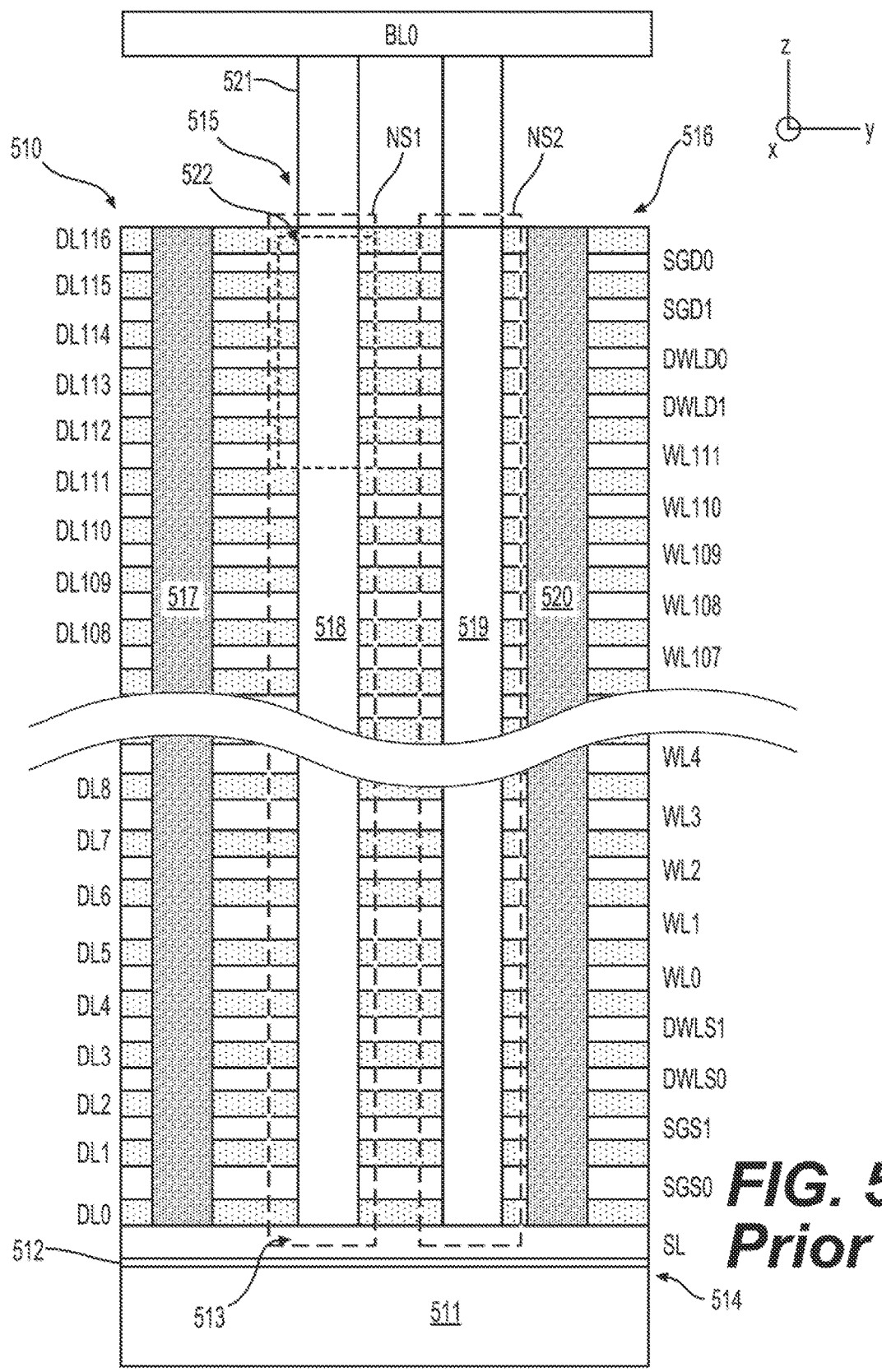
FIG. 5B - Prior Art

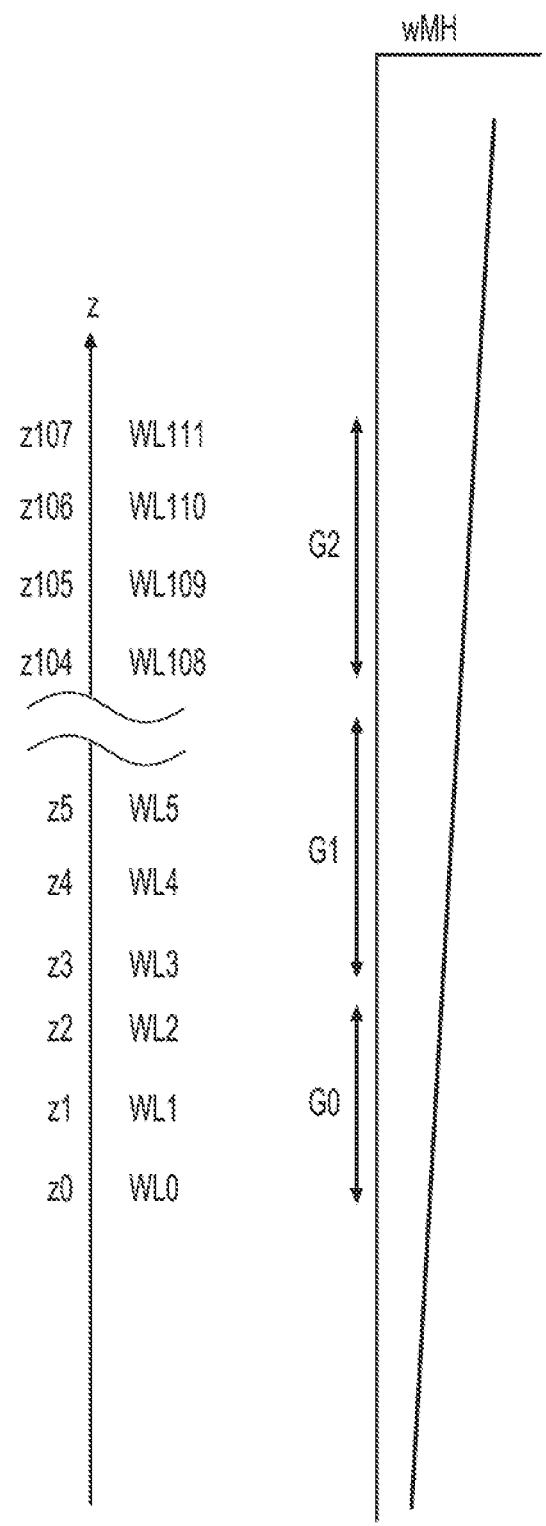
FIG. 5C – Prior Art

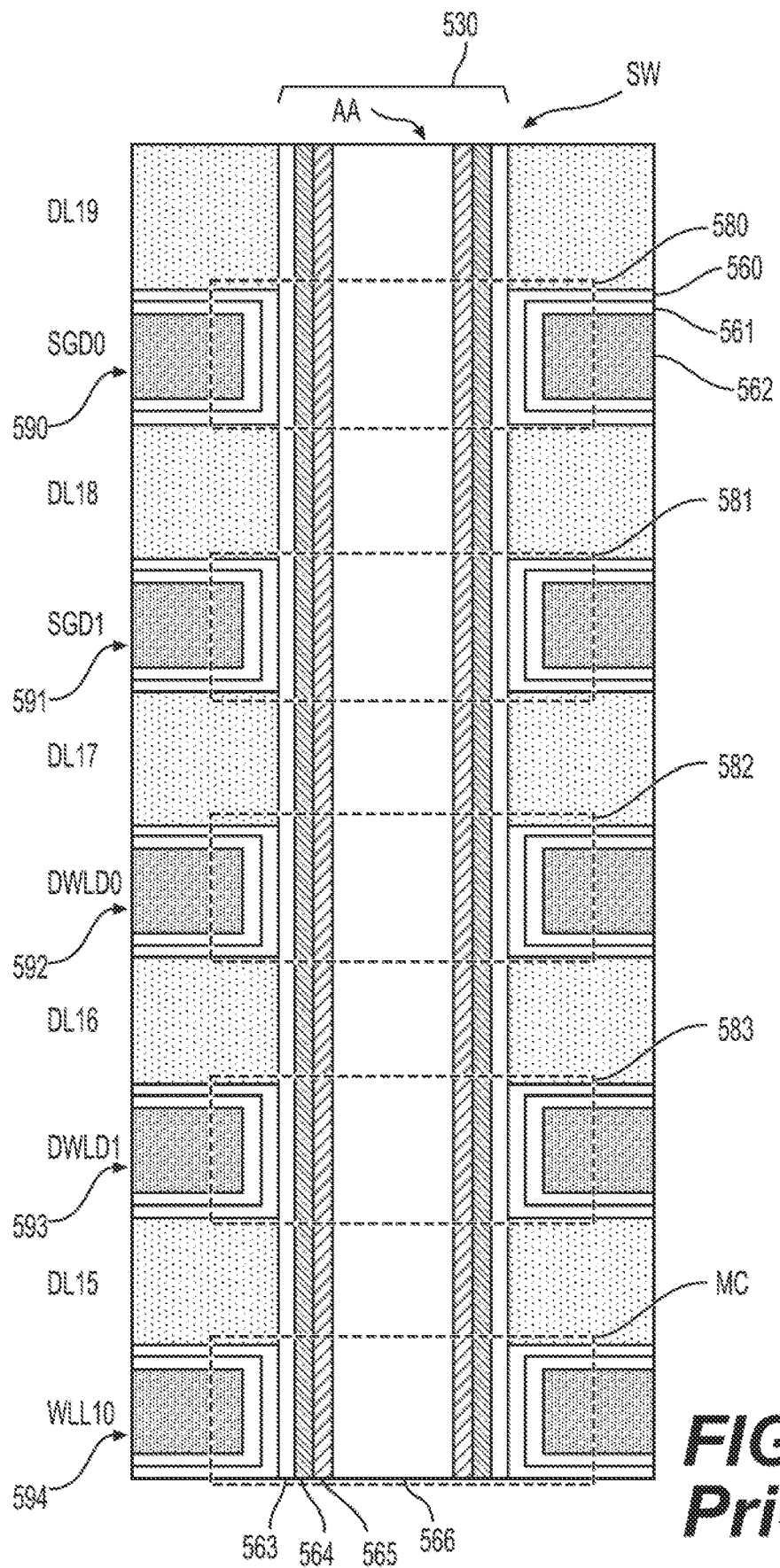
FIG. 5D – Prior Art

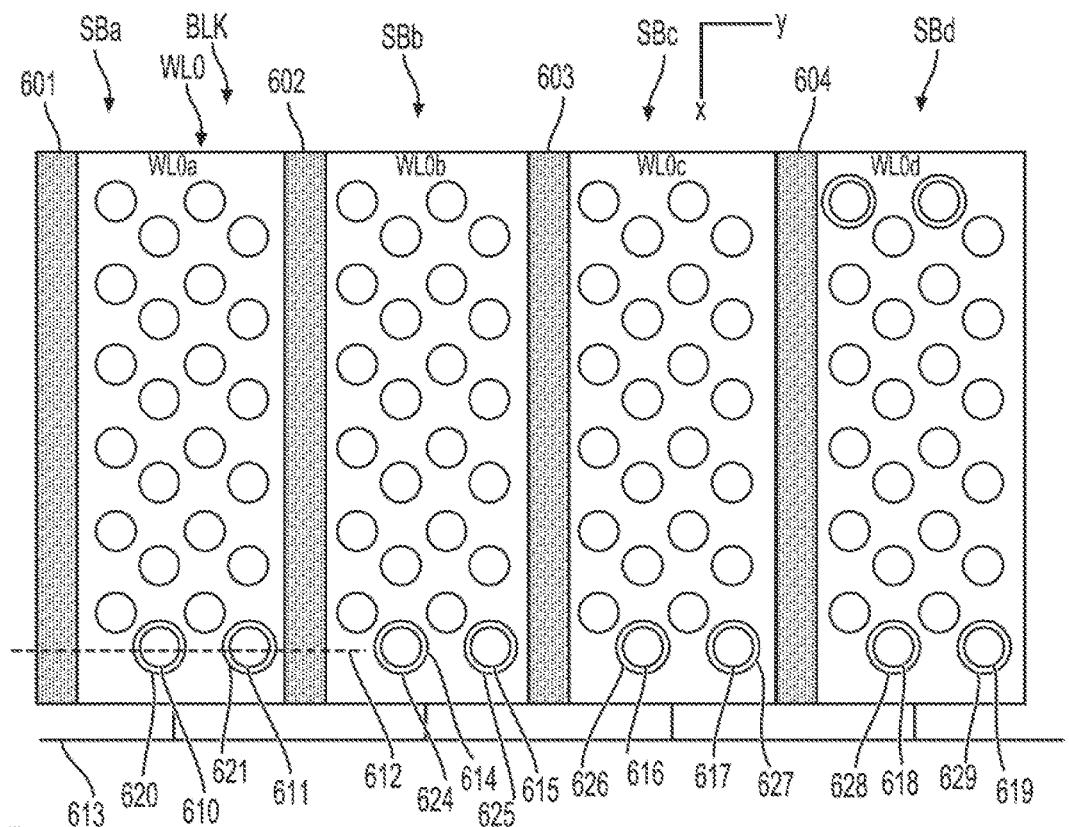
*FIG. 6A – Prior Art*
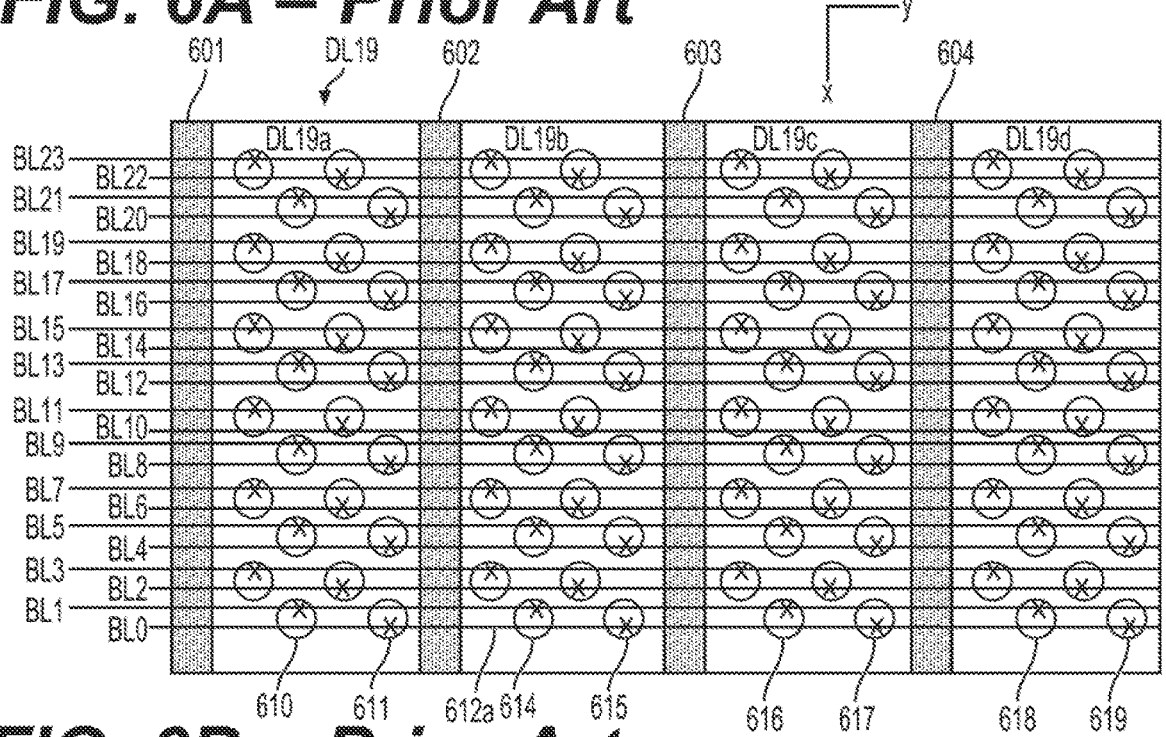
*FIG. 6B – Prior Art*

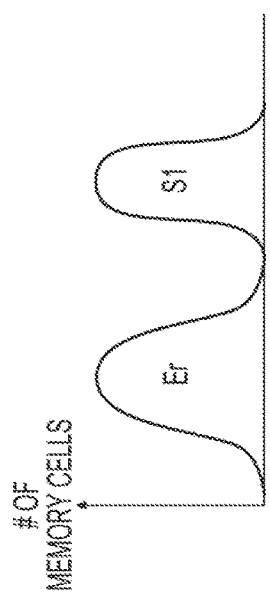
FIG. 7 – Prior Art
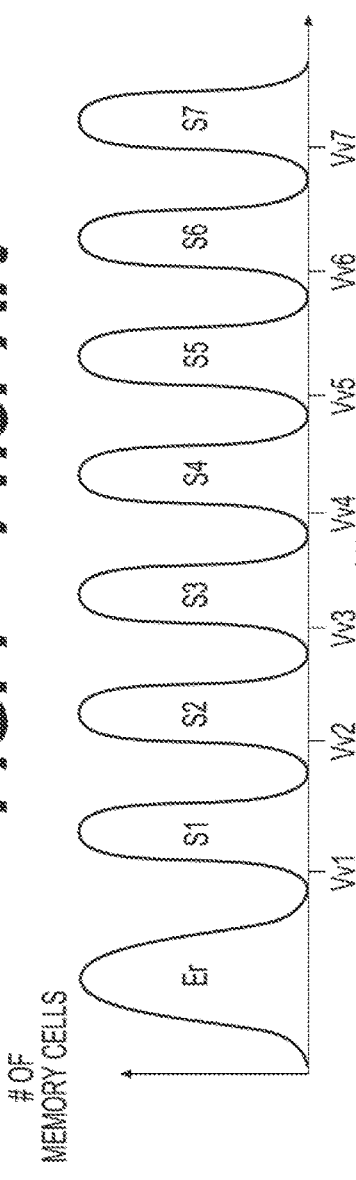
FIG. 8 – Prior Art
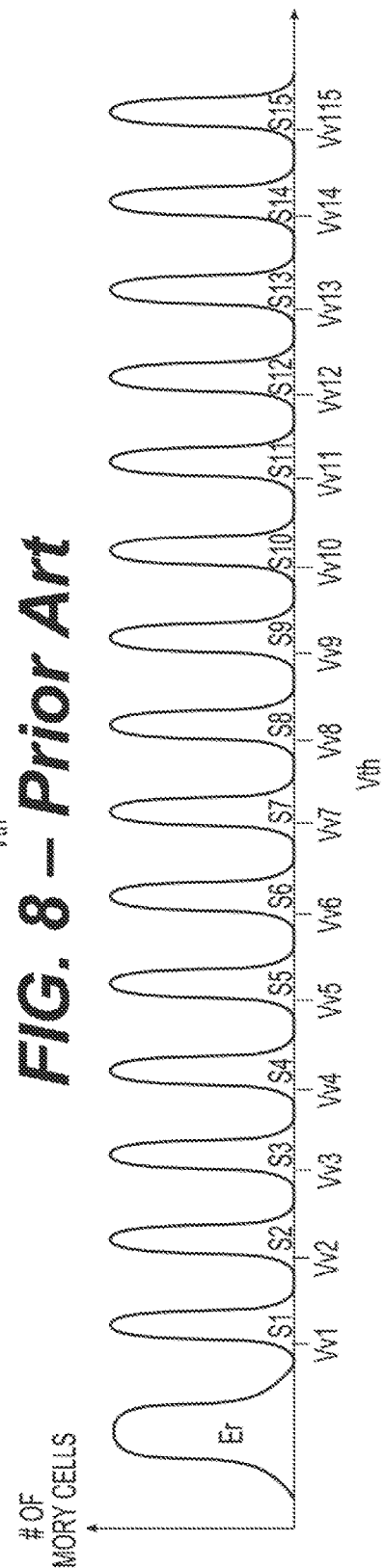
FIG. 9 – Prior Art

| | ERASE | ERASE VERIFY |
|---|---|---|
| BIT LINE | FLOATING | FLOATING |
| SGD | FLOATING | $V_{SG}$ |
| WLn | 0V | 0V |
| WLn-1 | 0V | 0V |
| . | 0V | 0V |
| . | 0V | 0V |
| WLi | 0V | 0V |
| . | 0V | 0V |
| . | 0V | 0V |
| WL1 | 0V | 0V |
| WLD | 0V | 0V |
| SGS | FLOATING | $V_{SGS}$ |
| SOURCE LINE | FLOATING | $V_{DD}$ |
| P-w0i | $V_{ERASE}$ | 0V |

*FIG. 11A*

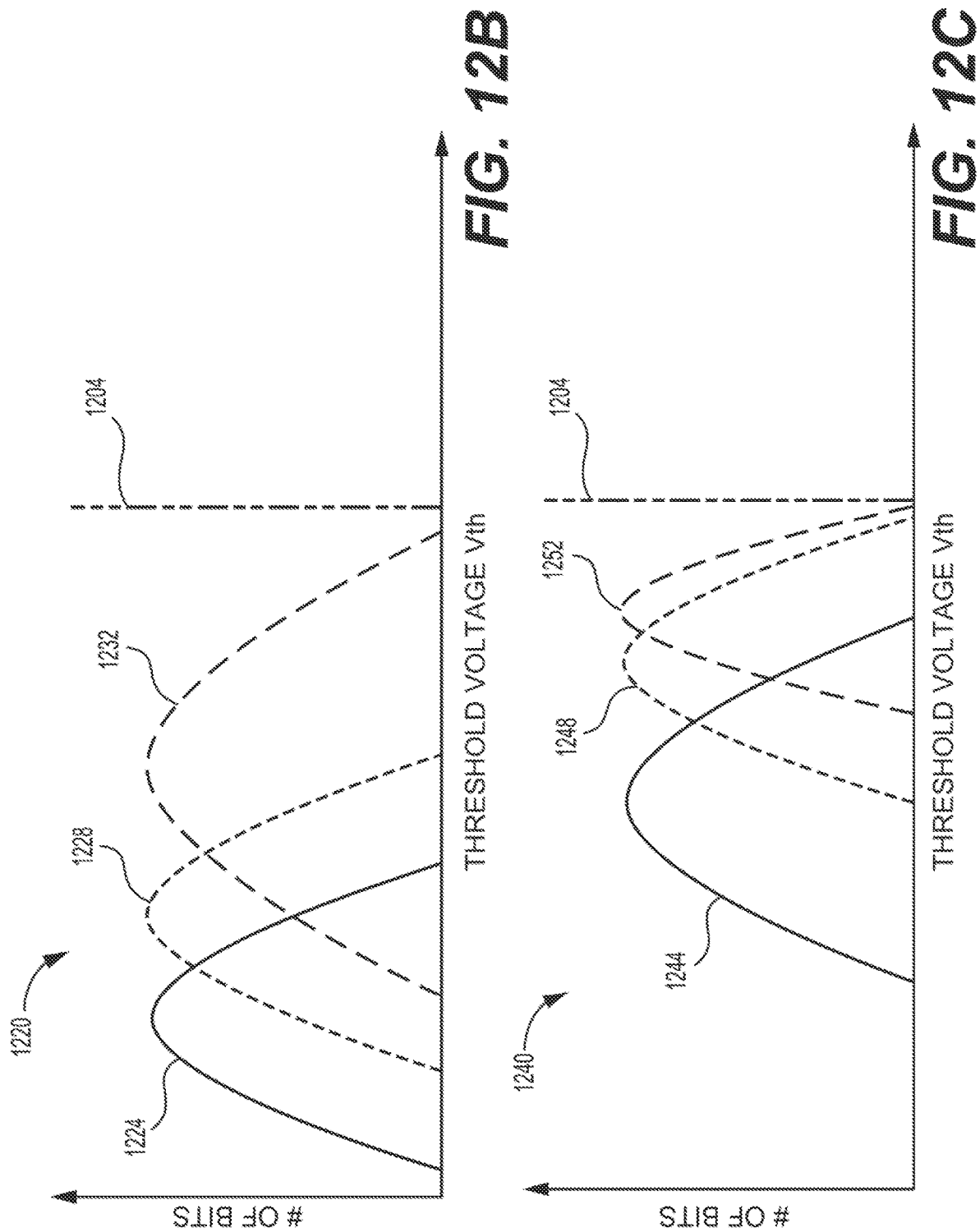

ADAPTIVE SINGLE-SIDE ERASE TO IMPROVE CELL RELIABILITY

CROSS-REFERENCE TO RELATED APPLICATIONS

This application claims the benefit of U.S. Provisional Application No. 63/467,732, filed on May 19, 2023. The entire disclosure of the application referenced above is incorporated herein by reference.

BACKGROUND

1. Field

The present disclosure is related generally to techniques for erasing the memory cells of a memory device.

2. Related Art

Semiconductor memory is widely used in various electronic devices, such as cellular telephones, digital cameras, personal digital assistants, medical electronics, mobile computing devices, servers, solid state drives, non-mobile computing devices and other devices. Semiconductor memory may comprise non-volatile memory or volatile memory. A non-volatile memory allows information to be stored and retained even when the non-volatile memory is not connected to a source of power, e.g., a battery. As one example, a NAND memory device includes a chip with a plurality of memory blocks, each of which includes an array of memory cells arranged in a plurality of word lines.

SUMMARY

A memory device includes a memory block comprising a plurality of memory strings each comprising a plurality of memory cells and control circuitry configured to perform an erase operation to erase the memory cells of each of the plurality of memory strings and perform an erase verify operation to verify whether the memory cells of each of the plurality of memory strings were sufficiently erased during the erase operation. To perform the erase operation, the control circuitry is configured to supply a first erase voltage pulse, perform the erase verify operation subsequent to supplying the first erase voltage pulse, subsequent to the erase verify operation, supply bias voltages including a first bias voltage to a first one of the plurality of memory strings and a second bias voltage different than the first bias voltage to a second one of the plurality of memory strings, and, while supplying the first and second bias voltages, supply a second erase voltage pulse. The second bias voltage supplied to the second one of the plurality of memory strings is configured to inhibit the second erase voltage pulse supplied to the memory cells of the second one of the plurality of memory strings.

In other features, the second erase voltage pulse has a greater magnitude than the first erase voltage pulse. The control circuitry is configured to determine a number of memory cells of each of the plurality of memory strings that did not pass the erase verify operation and determine the first and second bias voltages based on the determined number of memory cells of each of the plurality of memory strings that did not pass the erase verify operation. To determine the first and second bias voltages, the control circuitry is configured to compare the number of memory cells of each of the plurality of memory strings that did not pass the erase verify operation to at least one threshold and determine the first and second bias voltages based on the comparison. The control circuitry is configured to select the first bias voltage in response to the number of memory cells for the first one of the plurality of memory strings that did not pass the erase verify operation being greater than the at least one threshold and select the second bias voltage in response to the number of memory cells for the second one of the plurality of memory strings that did not pass the erase verify operation being less than the at least one threshold.

In other features, the control circuitry is configured to determine desired effective second erase voltage pulses for each of the plurality of memory strings based on the number of memory cells for each of the plurality of memory strings that did not pass the erase verify operation and determine the first and second bias voltages based on the desired effective second erase voltages. The control circuitry is configured to retrieve the first and second bias voltages from a lookup table that indexes the number of memory cells for each of the plurality of memory strings that did not pass the erase verify operation to at least one of the desired effective second erase voltages and the first and second bias voltages. Each of the plurality of memory strings includes a select gate transistor, and wherein the control circuitry is configured to supply the bias voltages to respective ones of the select gate transistors. The control circuit is configured to supply the bias voltages to the select gate transistors to inhibit the second erase voltage pulse.

A method of operating a memory device including a memory block, the memory block including a plurality of memory strings each including a plurality of memory cells, includes performing an erase operation to erase the memory cells of each of the plurality of memory strings and performing an erase verify operation to verify whether the memory cells of each of the plurality of memory strings were sufficiently erased during the erase operation. To perform the erase operation, the method includes supplying a first erase voltage pulse, performing the erase verify operation subsequent to supplying the first erase voltage pulse, subsequent to the erase verify operation, supplying bias voltages including a first bias voltage to a first one of the plurality of memory strings and a second bias voltage different than the first bias voltage to a second one of the plurality of memory strings, and, while supplying the first and second bias voltages, supplying a second erase voltage pulse. The second bias voltage supplied to the second one of the plurality of memory strings is configured to inhibit the second erase voltage pulse supplied to the memory cells of the second one of the plurality of memory strings.

In other features, the second erase voltage pulse has a greater magnitude than the first erase voltage pulse. The method further includes determining a number of memory cells of each of the plurality of memory strings that did not pass the erase verify operation and determining the first and second bias voltages based on the determined number of memory cells of each of the plurality of memory strings that did not pass the erase verify operation. To determine the first and second bias voltages, the method further includes comparing the number of memory cells of each of the plurality of memory strings that did not pass the erase verify operation to at least one threshold and determining the first and second bias voltages based on the comparison. The method further includes selecting the first bias voltage in response to the number of memory cells for the first one of the plurality of memory strings that did not pass the erase verify operation being greater than the at least one threshold and selecting the second bias voltage in response to the number of memory cells for the second one of the plurality of memory strings that did not pass the erase verify operation being less than the at least one threshold.

In other features, the method further includes determining desired effective second erase voltage pulses for each of the plurality of memory strings based on the number of memory cells for each of the plurality of memory strings that did not pass the erase verify operation and determining the first and second bias voltages based on the desired effective second erase voltages. The method further includes retrieving the first and second bias voltages from a lookup table that indexes the number of memory cells for each of the plurality of memory strings that did not pass the erase verify operation to at least one of the desired effective second erase voltages and the first and second bias voltages. Each of the plurality of memory strings includes a select gate transistor and the method further includes supplying the bias voltages to respective ones of the select gate transistors. The method further includes supplying the bias voltages to the select gate transistors to inhibit the second erase voltage pulse.

A memory device includes a memory block comprising a plurality of memory strings each comprising a plurality of memory cells and control means for performing an erase operation to erase the memory cells of each of the plurality of memory strings and performing an erase verify operation to verify whether the memory cells of each of the plurality of memory strings were sufficiently erased during the erase operation. To perform the erase operation, the control means supplies a first erase voltage pulse, performs the erase verify operation subsequent to supplying the first erase voltage pulse, subsequent to the erase verify operation, supplies bias voltages including a first bias voltage to a first one of the plurality of memory strings and a second bias voltage different than the first bias voltage to a second one of the plurality of memory strings, and, while supplying the first and second bias voltages, supplies a second erase voltage pulse. The second bias voltage supplied to the second one of the plurality of memory strings is configured to inhibit the second erase voltage pulse supplied to the memory cells of the second one of the plurality of memory strings.

In other features, the control means determines a number of memory cells of each of the plurality of memory strings that did not pass the erase verify operation and determines the first and second bias voltages based on the determined number of memory cells of each of the plurality of memory strings that did not pass the erase verify operation.

BRIEF DESCRIPTION OF THE DRAWINGS

A more detailed description is set forth below with reference to example embodiments depicted in the appended figures. Understanding that these figures depict only example embodiments of the disclosure and are, therefore, not to be considered limiting of its scope. The disclosure is described and explained with added specificity and detail through the use of the accompanying drawings in which:

FIG. 1 depicts blocks of memory cells in an example two-dimensional configuration of a memory array;

FIG. 2A and FIG. 2B depict cross-sectional views of example floating gate memory cells in NAND strings;

FIG. 3A and FIG. 3B depict cross-sectional views of example charge-trapping memory cells in NAND strings;

FIG. 4 depicts an example block diagram of a sense block SB1;

FIG. 5A is a perspective view of a set of blocks in an example three-dimensional configuration of a memory array;

FIG. 5B depicts an example cross-sectional view of a portion of one of the blocks of FIG. 5A;

FIG. 5C depicts a plot of memory hole diameter of the stack of FIG. 5B;

FIG. 5D depicts a close-up view of region 522 of the stack of FIG. 5B;

FIG. 6A depicts a top view of an example word line layer WL0 of the stack of FIG. 5B;

FIG. 6B depicts a top view of an example top dielectric layer DL116 of the stack of FIG. 5B;

FIG. 7 depicts a threshold voltage distribution of a page of memory cells programmed to one bit per memory cell (SLC);

FIG. 8 depicts a threshold voltage distribution of a page of memory cells programmed to three bits per memory cell (TLC);

FIG. 9 depicts a threshold voltage distribution of a page of memory cells programmed to four bits per memory cell (QLC);

FIG. 11A is a table of voltages applied to various components of the memory block during an example erase pulse and an erase-verify operation;

FIG. 12B depicts example voltage distributions of threshold voltages for various strings subsequent to a second VERA pulse in an erase operation;

FIG. 12C depicts example voltage distributions of threshold voltages for various strings subsequent to a modified second VERA pulse;

DESCRIPTION OF THE ENABLING EMBODIMENTS

Figure 10A:
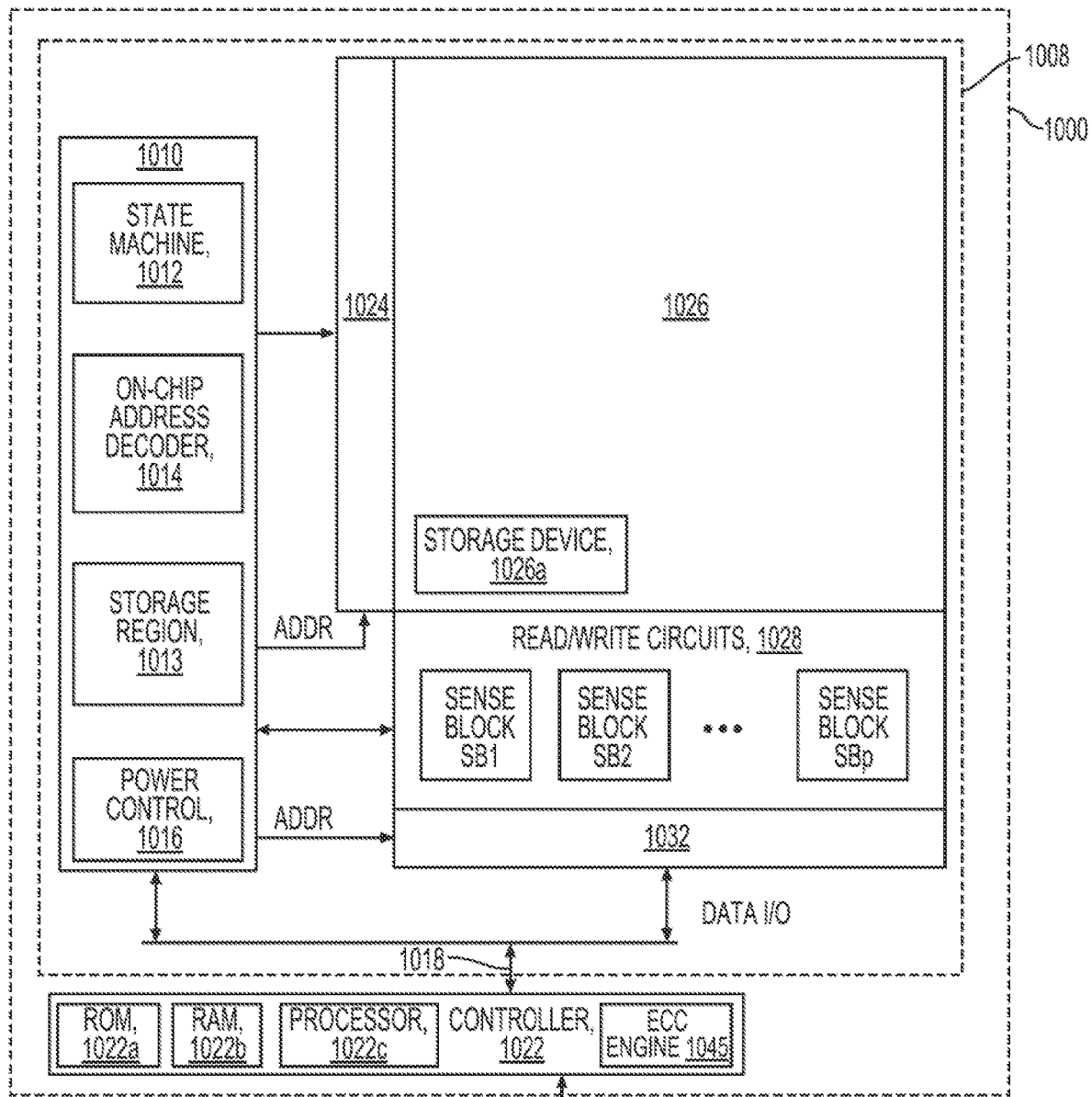
FIG. 10A is a block diagram of an example memory device.

Important design considerations for NAND memory devices include, but are not limited to, cost, performance, power management and consumption, and reliability. For example, for some types of erase operations (e.g., triple-level cell (TLC) erase operations), two or more erase cycles may be required to pass an erase verify ("EVFY") operation. Accordingly, multiple erase voltage ("VERA") pulses and/or a higher VERA may be required to perform the erase operation. However, repeated VERA pulses and VERA pulses having a higher magnitude may degrade memory cell reliability.

For example, high electric fields (e.g., vertical E-fields) generated during erase operations enhance Fowler-Nordheim (FN) hole tunneling. However, impact ionization of captured holes creates traps in both a tunneling layer (TNL) and a charge trap layer (CTL), which degrades both lateral and vertical data retention (DR). Some systems include a negative word line (WL) mode, which requires a deep erase and higher VERA pulses and furthers contribute to the degradation of the subsequent DR reliability (e.g., due to lateral diffusion). Accordingly, controlling electric fields during erase operations can improve memory cell reliability.

Systems and methods according to the present disclosure are configured to inhibit erase operations on selected memory strings and their respective cells. For example, for some memory device designs, different memory strings may have different erase speeds. In other words, some memory strings may successfully erase (and, therefore, pass the EVFY operation) more quickly than other strings. As one example, outer strings may erase more quickly than inner strings, which in turn may erase more quickly than center strings. The systems and methods according to the present disclosure are configured to inhibit VERA pulse magnitude for selected memory strings that have passed the EVFY operation. Although described with respect to TLC erase operations, the principles of the present disclosure may be implemented in erase operations for other types of memory cells (e.g., quad-level cell (QLC), penta-level cell (PLC), etc.).

A pair of example memory blocks 100, 110 are illustrated in a FIG. 1. The memory blocks 100, 110 may be implemented in a system comprising a controller or control circuitry configured to perform an erase verify skip operation according to the present disclosure. In this example, the memory blocks 100, 110 have a two-dimensional configuration. A memory array in the chip can include many such blocks 100, 110. Each example block 100, 110 includes a number of NAND strings and respective bit lines, e.g., BL0, BL1, . . . which are shared among the blocks. Each NAND string is connected at one end to a drain-side select gate (SGD), and the control gates of the drain select gates are connected, in some examples, via a common SGD line. The NAND strings are connected at their other end to a source-side select gate (SGS) which, in turn, is connected to a common source line 120. One hundred and twelve word lines (WL0-WL111), for example, extend between the SGSs and the SGDs. In some embodiments, the memory block may include more or fewer than one hundred and twelve word lines. For example, in some embodiments, a memory block includes one hundred and sixty-four word lines. In some cases, dummy word lines, which contain no user data, can also be used in the memory array adjacent to the select gate transistors. Such dummy word lines can shield the edge data word line from certain edge effects.

One type of non-volatile memory which may be provided in the memory array is a floating gate memory, such as of the type shown in FIGS. 2A and 2B. However, other types of non-volatile memory can also be used. As discussed in further detail below, in another example shown in FIGS. 3A and 3B, a charge-trapping memory cell uses a non-conductive dielectric material in place of a conductive floating gate to store charge in a non-volatile manner. A triple layer dielectric formed of silicon oxide, silicon nitride and silicon oxide ("ONO") is sandwiched between a conductive control gate and a surface of a semi-conductive substrate above the memory cell channel. The memory cell is programmed by injecting electrons from the cell channel into the nitride, where they are trapped and stored in a limited region. This stored charge then changes the threshold voltage Vt of a portion of the channel of the cell in a manner that is detectable. The memory cell is erased by injecting hot holes into the nitride. A similar cell can be provided in a split-gate configuration where a doped polysilicon gate extends over a portion of the memory cell channel to form a separate select transistor.

In another approach, NROM cells are used. Two bits, for example, are stored in each NROM cell, where an ONO dielectric layer extends across the channel between source and drain diffusions. The charge for one data bit is localized in the dielectric layer adjacent to the drain, and the charge for the other data bit is localized in the dielectric layer adjacent to the source. Multi-state data storage is obtained by separately reading binary states of the spatially separated charge storage regions within the dielectric. Other types of non-volatile memory are also known.

FIG. 2A illustrates a cross-sectional view of example floating gate memory cells 200, 210, 220 in NAND strings. In this Figure, a bit line or NAND string direction goes into the page, and a word line direction goes from left to right. As an example, word line 224 extends across NAND strings which include respective channel regions 206, 216 and 226. The memory cell 200 includes a control gate 202, a floating gate 204, a tunnel oxide layer 205 and the channel region 206. The memory cell 210 includes a control gate 212, a floating gate 214, a tunnel oxide layer 215 and the channel region 216. The memory cell 220 includes a control gate 222, a floating gate 221, a tunnel oxide layer 225 and the channel region 226. Each memory cell 200, 210, 220 is in a different respective NAND string. An inter-poly dielectric (IPD) layer 228 is also illustrated. The control gates 202, 212, 222 are portions of the word line. A cross-sectional view along contact line connector 229 is provided in FIG. 2B.

The control gate 202, 212, 222 wraps around the floating gate 204, 214, 221, increasing the surface contact area between the control gate 202, 212, 222 and floating gate 204, 214, 221. This results in higher IPD capacitance, leading to a higher coupling ratio which makes programming and erase easier. However, as NAND memory devices are scaled down, the spacing between neighboring cells 200, 210, 220 becomes smaller so there is almost no space for the control gate 202, 212, 222 and the IPD layer 228 between two adjacent floating gates 202, 212, 222.

As an alternative, as shown in FIGS. 3A and 3B, the flat or planar memory cell 300, 310, 320 has been developed in which the control gate 302, 312, 322 is flat or planar; that is, it does not wrap around the floating gate and its only contact with the IPD layer 328 is from above it. In this case, there is no advantage in having a tall floating gate. Instead, the floating gate is made much thinner. Further, the floating gate can be used to store charge, or a thin charge trap layer can be used to trap charge. This approach can avoid the issue of ballistic electron transport, where an electron can travel through the floating gate after tunneling through the tunnel oxide during programming.

FIG. 3A depicts a cross-sectional view of example charge-trapping memory cells 300, 310, 320 in NAND strings. The view is in a word line direction of memory cells 300, 310, 320 comprising a flat control gate and charge-trapping regions as a two-dimensional example of memory cells 300, 310, 320 in the memory cell array 126. Charge-trapping memory can be used in NOR and NAND flash memory device. This technology uses an insulator such as an SiN film to store electrons, in contrast to a floating-gate MOSFET technology which uses a conductor such as doped polycrystalline silicon to store electrons. As an example, a word line 324 extends across NAND strings which include respective channel regions 306, 316, 326. Portions of the word line provide control gates 302, 312, 322. Below the word line is an IPD layer 328, charge-trapping layers 304, 314, 321, polysilicon layers 305, 315, 325, and tunneling layers 309, 307, 308. Each charge-trapping layer 304, 314, 321 extends continuously in a respective NAND string. The flat configuration of the control gate can be made thinner than a floating gate. Additionally, the memory cells can be placed closer together.

FIG. 3B illustrates a cross-sectional view of the structure of FIG. 3A along contact line connector 329. The NAND string 330 includes an SGS transistor 331, example memory cells 300, 333, . . . 335, and an SGD transistor 336. Passageways in the IPD layer 328 in the SGS and SGD transistors 331, 336 allow the control gate layers 302 and floating gate layers to communicate. The control gate 302 and floating gate layers may be polysilicon and the tunnel oxide layer may be silicon oxide, for instance. The IPD layer 328 can be a stack of nitrides (N) and oxides (O) such as in a N-O-N-O-N configuration.

The NAND string may be formed on a substrate which comprises a p-type substrate region 355, an n-type well 356 and a p-type well 357. N-type source/drain diffusion regions sd1, sd2, sd3, sd4, sd5, sd6 and sd7 are formed in the p-type well. A channel voltage, Vch, may be applied directly to the channel region of the substrate.

FIG. 4 illustrates an example block diagram of a sense block SB1 in a memory chip. In one approach, a sense block comprises multiple sense circuits. Each sense circuit is associated with data latches. For example, the example sense circuits 450a, 451a, 452a, and 453a are associated with the data latches 450b, 451b, 452b, and 453b, respectively. In one approach, different subsets of bit lines can be sensed using different respective sense blocks. This allows the processing load which is associated with the sense circuits to be divided up and handled by a respective processor in each sense block. For example, a sense circuit controller 460 in SB1 can communicate with the set of sense circuits and latches. The sense circuit controller 460 may include a pre-charge circuit 461 which provides a voltage to each sense circuit for setting a pre-charge voltage. In one possible approach, the voltage is provided to each sense circuit independently, e.g., via the data bus and a local bus. In another possible approach, a common voltage is provided to each sense circuit concurrently. The sense circuit controller 460 may also include a pre-charge circuit 461, a memory 462 and a processor 463. The memory 462 may store code which is executable by the processor to perform the functions described herein. These functions can include reading the latches 450b, 451b, 452b, 453b which are associated with the sense circuits 450a, 451a, 452a, 453a, setting bit values in the latches and providing voltages for setting pre-charge levels in sense nodes of the sense circuits 450a, 451a, 452a, 453a. Further example details of the sense circuit controller 460 and the sense circuits 450a, 451a, 452a, 453a are provided below.

In some embodiments, a memory cell may include a flag register that includes a set of latches storing flag bits. In some embodiments, a quantity of flag registers may correspond to a quantity of data states. In some embodiments, one or more flag registers may be used to control a type of verification technique used when verifying memory cells. In some embodiments, a flag bit's output may modify associated logic of the device, e.g., address decoding circuitry, such that a specified block of cells is selected. A bulk operation (e.g., an erase operation, etc.) may be carried out using the flags set in the flag register, or a combination of the flag register with the address register, as in implied addressing, or alternatively by straight addressing with the address register alone.

FIG. 5A is a perspective view of a set of blocks 500 in an example three-dimensional configuration. On the substrate are example blocks BLK0, BLK1, BLK2, BLK3 of memory cells (storage elements) and a peripheral area 504 with circuitry for use by the blocks BLK0, BLK1, BLK2, BLK3. For example, the circuitry can include voltage drivers 505 which can be connected to control gate layers of the blocks BLK0, BLK1, BLK2, BLK3. In one approach, control gate layers at a common height in the blocks BLK0, BLK1, BLK2, BLK3 are commonly driven. The substrate 501 can also carry circuitry under the blocks BLK0, BLK1, BLK2, BLK3, along with one or more lower metal layers which are patterned in conductive paths to carry signals of the circuitry. The blocks BLK0, BLK1, BLK2, BLK3 are formed in an intermediate region 502 of the memory device. In an upper region 503 of the memory device, one or more upper metal layers are patterned in conductive paths to carry signals of the circuitry. Each block BLK0, BLK1, BLK2, BLK3 comprises a stacked area of memory cells, where alternating levels of the stack represent word lines. In one possible approach, each block BLK0, BLK1, BLK2, BLK3 has opposing tiered sides from which vertical contacts extend upward to an upper metal layer to form connections to conductive paths. While four blocks BLK0, BLK1, BLK2, BLK3 are illustrated as an example, two or more blocks can be used, extending in the x- and/or y-directions.

In one possible approach, the length of the plane, in the x-direction, represents a direction in which signal paths to word lines extend in the one or more upper metal layers (a word line or SGD line direction), and the width of the plane, in the y-direction, represents a direction in which signal paths to bit lines extend in the one or more upper metal layers (a bit line direction). The z-direction represents a height of the memory device.

FIG. 5B illustrates an example cross-sectional view of a portion of one of the blocks BLK0, BLK1, BLK2, BLK3 of FIG. 5A. The block comprises a stack 510 of alternating conductive and dielectric layers. In this example, the conductive layers comprise two SGD layers, two SGS layers and four dummy word line layers DWLD0, DWLD1, DWLS0 and DWLS1, in addition to data word line layers (word lines) WL0-WL111. The dielectric layers are labelled as DL0-DL116. Further, regions of the stack 510 which comprise NAND strings NS1 and NS2 are illustrated. Each NAND string encompasses a memory hole 518, 519 which is filled with materials which form memory cells adjacent to the word lines. A region 522 of the stack 510 is shown in greater detail in FIG. 5D and is discussed in further detail below.

The stack 510 includes a substrate 511, an insulating film 512 on the substrate 511, and a portion of a source line SL. NS1 has a source-end 513 at a bottom 514 of the stack and a drain-end 515 at a top 516 of the stack 510. Contact line connectors (e.g., slits, such as metal-filled slits) 517, 520 may be provided periodically across the stack 510 as interconnects which extend through the stack 510, such as to connect the source line to a particular contact line above the stack 510. The contact line connectors 517, 520 may be used during the formation of the word lines and subsequently filled with metal. A portion of a bit line BL0 is also illustrated. A conductive via 521 connects the drain-end 515 to BL0.

FIG. 5C illustrates a plot of memory hole diameter in the stack of FIG. 5B. The vertical axis is aligned with the stack of FIG. 5B and illustrates a width (wMH), e.g., diameter, of the memory holes 518 and 519. The word line layers WL0-WL111 of FIG. 5A are repeated as an example and are at respective heights z0-z111 in the stack. In such a memory device, the memory holes which are etched through the stack have a very high aspect ratio. For example, a depth-to-diameter ratio of about 25-30 is common. The memory holes may have a circular cross-section. Due to the etching process, the memory hole width can vary along the length of the hole. Typically, the diameter becomes progressively smaller from the top to the bottom of the memory hole. That is, the memory holes are tapered, narrowing at the bottom of the stack. In some cases, a slight narrowing occurs at the top of the hole near the select gate so that the diameter becomes slightly wider before becoming progressively smaller from the top to the bottom of the memory hole.

FIG. 5D illustrates a close-up view of the region 522 of the stack 510 of FIG. 5B. Memory cells are formed at the different levels of the stack at the intersection of a word line layer and a memory hole. In this example, SGD transistors 580, 581 are provided above dummy memory cells 582, 583 and a data memory cell MC. A number of layers can be deposited along the sidewall (SW) of the memory hole 530 and/or within each word line layer, e.g., using atomic layer deposition. For example, each column (e.g., the pillar which is formed by the materials within a memory hole 530) can include a charge-trapping layer or film 563 such as SiN or other nitride, a tunneling layer 564, a polysilicon body or channel 565, and a dielectric core 566. A word line layer can include a blocking oxide/block high-k material 560, a metal barrier 561, and a conductive metal 562 such as Tungsten as a control gate. For example, control gates 590, 591, 592, 593, and 594 are provided. In this example, all of the layers except the metal are provided in the memory hole 530. In other approaches, some of the layers can be in the control gate layer. Additional pillars are similarly formed in the different memory holes. A pillar can form a columnar active area (AA) of a NAND string.

When a memory cell is programmed, electrons are stored in a portion of the charge-trapping layer which is associated with the memory cell. These electrons are drawn into the charge-trapping layer from the channel, and through the tunneling layer. The Vt of a memory cell is increased in proportion to the amount of stored charge. During an erase operation, the electrons return to the channel.

Each of the memory holes 530 can be filled with a plurality of annular layers comprising a blocking oxide layer, a charge trapping layer 563, a tunneling layer 564 and a channel layer. A core region of each of the memory holes 530 is filled with a body material, and the plurality of annular layers are between the core region and the word line in each of the memory holes 530.

The NAND string can be considered to have a floating body channel because the length of the channel is not formed on a substrate. Further, the NAND string is provided by a plurality of word line layers above one another in a stack, and separated from one another by dielectric layers.

FIG. 6A illustrates a top view of an example word line layer WL0 of the stack 510 of FIG. 5B. As mentioned, a three-dimensional memory device can comprise a stack of alternating conductive and dielectric layers. The conductive layers provide the control gates of the SG transistors and memory cells. The layers used for the SG transistors are SG layers and the layers used for the memory cells are word line layers. Further, memory holes are formed in the stack and filled with a charge-trapping material and a channel material. As a result, a vertical NAND string is formed. Source lines are connected to the NAND strings below the stack and bit lines are connected to the NAND strings above the stack.

A block BLK in a three-dimensional memory device can be divided into sub-blocks, where each sub-block comprises a NAND string group which has a common SGD control line. For example, see the SGD lines/control gates SGD0, SGD1, SGD2 and SGD3 in the sub-blocks SBa, SBb, SBc and SBd, respectively. Further, a word line layer in a block can be divided into regions. Each region is in a respective sub-block and can extend between contact line connectors (e.g., slits) which are formed periodically in the stack to process the word line layers during the fabrication process of the memory device. This processing can include replacing a sacrificial material of the word line layers with metal. Generally, the distance between contact line connectors should be relatively small to account for a limit in the distance that an etchant can travel laterally to remove the sacrificial material, and that the metal can travel to fill a void which is created by the removal of the sacrificial material. For example, the distance between contact line connectors may allow for a few rows of memory holes between adjacent contact line connectors. The layout of the memory holes and contact line connectors should also account for a limit in the number of bit lines which can extend across the region while each bit line is connected to a different memory cell. After processing the word line layers, the contact line connectors can optionally be filed with metal to provide an interconnect through the stack.

In this example, there are four rows of memory holes between adjacent contact line connectors. A row here is a group of memory holes which are aligned in the x-direction. Moreover, the rows of memory holes are in a staggered pattern to increase the density of the memory holes. The word line layer or word line is divided into regions WL0*a*, WL0*b*, WL0*c* and WL0*d* which are each connected by a contact line 613. The last region of a word line layer in a block can be connected to a first region of a word line layer in a next block, in one approach. The contact line 613, in turn, is connected to a voltage driver for the word line layer. The region WL0*a* has example memory holes 610, 611 along a contact line 612. The region WL0*b* has example memory holes 614, 615. The region WL0*c* has example memory holes 616, 617. The region WL0*d* has example memory holes 618, 619. The memory holes are also shown in FIG. 6B. Each memory hole can be part of a respective NAND string. For example, the memory holes 610, 614, 616 and 618 can be part of NAND strings NS0_SBa, NS1_SBb, NS2_SBc, NS3_SBd, and NS4_SBe, respectively.

Each circle represents the cross-section of a memory hole at a word line layer or SG layer. Example circles shown with dashed lines represent memory cells which are provided by the materials in the memory hole and by the adjacent word line layer. For example, memory cells 620, 621 are in WL0*a*, memory cells 624, 625 are in WL0*b*, memory cells 626, 627 are in WL0*c*, and memory cells 628, 629 are in WL0*d*. These memory cells are at a common height in the stack.

Contact line connectors (e.g., slits, such as metal-filled slits) 601, 602, 603, 604 may be located between and adjacent to the edges of the regions WL0*a*-WL0*d*. The contact line connectors 601, 602, 603, 604 provide a conductive path from the bottom of the stack to the top of the stack. For example, a source line at the bottom of the stack may be connected to a conductive line above the stack, where the conductive line is connected to a voltage driver in a peripheral region of the memory device.

FIG. 6B illustrates a top view of an example top dielectric layer DL116 of the stack of FIG. 5B. The dielectric layer is divided into regions DL116*a*, DL116*b*, DL116*c* and DL116*d*. Each region can be connected to a respective voltage driver. This allows a set of memory cells in one region of a word line layer being programmed concurrently, with each memory cell being in a respective NAND string which is connected to a respective bit line. A voltage can be set on each bit line to allow or inhibit programming during each program voltage.

The region DL116a has the example memory holes 610, 611 along a contact line 612, which is coincident with a bit line BL0. A number of bit lines extend above the memory holes and are connected to the memory holes as indicated by the "X" symbols. BL0 is connected to a set of memory holes which includes the memory holes 611, 615, 617, 619. Another example bit line BL1 is connected to a set of memory holes which includes the memory holes 610, 614, 616, 618. The contact line connectors (e.g., slits, such as metal-filled slits) 601, 602, 603, 604 from FIG. 6A are also illustrated, as they extend vertically through the stack. The bit lines can be numbered in a sequence BL0-BL23 across the DL116 layer in the x-direction.

Different subsets of bit lines are connected to memory cells in different rows. For example, BL0, BL4, BL8, BL12, BL16, BL20 are connected to memory cells in a first row of cells at the right-hand edge of each region. BL2, BL6, BL10, BL14, BL18, BL22 are connected to memory cells in an adjacent row of cells, adjacent to the first row at the right-hand edge. BL3, BL7, BL11, BL15, BL19, BL23 are connected to memory cells in a first row of cells at the left-hand edge of each region. BL1, BL5, BL9, BL13, BL17, BL21 are connected to memory cells in an adjacent row of memory cells, adjacent to the first row at the left-hand edge.

The memory cells of the memory blocks can be programmed to retain one or more bits of data in multiple data states, each of which is associated with a respective threshold voltage Vt range. For example, FIG. 7 depicts a threshold voltage Vt distribution of a group of memory cells programmed according to a one bit per memory cell (SLC) storage scheme. In the SLC storage scheme, there are two total data states, including the erased state (Er) and a single programmed data state (S1). FIG. 8 illustrates the threshold voltage Vt distribution of a three bits per cell (TLC) storage scheme that includes eight total data states, namely the erased state (Er) and seven programmed data states (S1, S2, S3, S4, S5, S6, and S7). Each programmed data state (S1-S7) is associated with a respective verify voltage (Vv1-Vv7), which is employed during a verify portion of a programming operation. FIG. 9 depicts a threshold voltage Vt distribution of a four bits per cell (QLC) storage scheme that includes sixteen total data states, namely the erased state (Er) and fifteen programmed data states (S1-S 15). Other storage schemes are also available, such as two bits per cell (MLC) with four data states or five bits per cell (PLC) with thirty-two data states. Generally, programming a fixed amount of data into memory cells at a higher number of bits per memory cell (such as TLC or QLC) requires more time than programming the same amount of data into more memory cells at a reduced number of bits per cell. In other words, there is a tradeoff between programming high speed (performance) and programming at high density. Also, programming to TLC or QLC stresses the memory cells more than programming to SLC, and therefore, the endurance (as measured in terabytes written [TBW]) of a memory device programming to SLC is generally greater than the endurance of a memory device programming to TLC or QLC.

FIG. 10A is a block diagram of an example memory device 1000 that is configured to operate according to the erasing techniques of the present disclosure. The memory die 1008 includes a memory structure 1026 of memory cells arranged in word lines, such as an array of memory cells, control circuitry 1010, and read/write circuits 1028. The memory structure 1026 is addressable by word lines via a row decoder 1024 and by bit lines via a column decoder 1032. The read/write circuits 1028 include multiple sense blocks SB1, SB2, . . . SBp (sensing circuitry) and allow a page of memory cells to be read or programmed in parallel. A controller 1022 may be included in the same memory device 1000 (e.g., a removable storage card) as the one or more memory die 1008. Commands and data are transferred between the host 1040 and controller 1022 via a data bus 1020, and between the controller and the one or more memory die 1008 via lines 1018. In some examples, the controller 1022 is configured to perform all or portions of the erase operation of the present disclosure. Control circuitry 1010 may also be configured to perform all or portions of the erase operation of the present disclosure.

The memory structure 1026 can be two-dimensional or three-dimensional. The memory structure 1026 may comprise one or more array of memory cells including a three-dimensional array. The memory structure 1026 may comprise a monolithic three-dimensional memory structure in which multiple memory levels are formed above (and not in) a single substrate, such as a wafer, with no intervening substrates. The memory structure 1026 may comprise any type of non-volatile memory that is monolithically formed in one or more physical levels of arrays of memory cells having an active area disposed above a silicon substrate. The memory structure 1026 may be in a non-volatile memory device having circuitry associated with the operation of the memory cells, whether the associated circuitry is above or within the substrate.

The control circuitry 1010 cooperates with the read/write circuits 1028 to perform memory operations on the memory structure 1026, and includes a state machine 1012, an on-chip address decoder 1014, and a power control module 1016. The state machine 1012 provides chip-level control of memory operations. As discussed in further detail below, the control circuitry 1010 is configured to operate the memory device 1000 according to erase techniques of the present disclosure.

Turning back to FIG. 10A, a storage region 1013 may, for example, be provided for programming parameters. The programming parameters may include a program voltage, a program voltage bias, position parameters indicating positions of memory cells, contact line connector thickness parameters, a verify voltage, and/or the like. The position parameters may indicate a position of a memory cell within the entire array of NAND strings, a position of a memory cell as being within a particular NAND string group, a position of a memory cell on a particular plane, and/or the like. The contact line connector thickness parameters may indicate a thickness of a contact line connector, a substrate or material that the contact line connector is comprised of, and/or the like.

The on-chip address decoder 1014 provides an address interface that is used by the host or a memory controller to determine the hardware address used by the decoders 1024 and 1032. The power control module 1016 controls the power and voltages supplied to the word lines and bit lines during memory operations. It can include drivers for word lines, SGS and SGD transistors, and source lines. The sense blocks can include bit line drivers, in one approach. An SGS transistor is a select gate transistor at a source end of a NAND string, and an SGD transistor is a select gate transistor at a drain end of a NAND string.

In some embodiments, some of the components can be combined. In various designs, one or more of the components (alone or in combination), other than memory structure 1026, can be thought of as at least one control circuit which is configured to perform the actions described herein. For example, a control circuit may include any one of, or a combination of, control circuitry 1010, state machine 1012, decoders 1014/1032, power control module 1016, sense blocks SBb, SB2, . . . , SBp, read/write circuits 1028, controller 1022, and so forth.

Figure 10B:
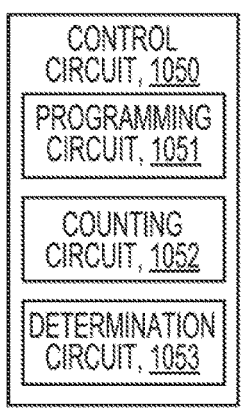
FIG. 10B is a block diagram of an example control circuit.

The control circuits can include a programming circuit configured to perform a program and verify operation for one set of memory cells, wherein the one set of memory cells comprises memory cells assigned to represent one data state among a plurality of data states and memory cells assigned to represent another data state among the plurality of data states; the program and verify operation comprising a plurality of program and verify iterations; and in each program and verify iteration, the programming circuit performs programming for the one selected word line after which the programming circuit applies a verification signal to the selected word line. The control circuits can also include a counting circuit configured to obtain a count of memory cells which pass a verify test for the one data state. The control circuits can also include a determination circuit configured to determine, based on an amount by which the count exceeds a threshold, whether a programming operation is completed. For example, FIG. 10B is a block diagram of an example control circuit 1050 which comprises a programming circuit 1051, a counting circuit 1052, and a determination circuit 1053. The control circuit 1050 may be configured to perform all or portions of the erase operation of the present disclosure.

The controller 1022 may comprise a processor 1022*c*, storage devices (memory) such as ROM 1022*a* and RAM 1022*b* and an error-correction code (ECC) engine 1045. The ECC engine can correct a number of read errors which are caused when the upper tail of a Vth distribution becomes too high. However, uncorrectable errors may exist in some cases. The techniques provided herein reduce the likelihood of uncorrectable errors.

The storage device(s) 1022*a*, 1022*b* comprise, code such as a set of instructions, and the processor 1022*c* is operable to execute the set of instructions to provide the functionality described herein. Alternately or additionally, the processor 1022*c* can access code from a storage device 1026*a* of the memory structure 1026, such as a reserved area of memory cells in one or more word lines. For example, code can be used by the controller 1022 to access the memory structure 1026 such as for programming, read and erase operations. The code can include boot code and control code (e.g., set of instructions). The boot code is software that initializes the controller 1022 during a booting or startup process and enables the controller 1022 to access the memory structure 1026. The code can be used by the controller 1022 to control one or more memory structures 1026. Upon being powered up, the processor 1022*c* fetches the boot code from the ROM 1022*a* or storage device 1026*a* for execution, and the boot code initializes the system components and loads the control code into the RAM 1022*b*. Once the control code is loaded into the RAM 1022*b*, it is executed by the processor 1022*c*. The control code includes drivers to perform basic tasks such as controlling and allocating memory, prioritizing the processing of instructions, and controlling input and output ports.

Generally, the control code can include instructions to perform the functions described herein including the steps of the flowcharts discussed further below and provide the voltage waveforms including those discussed further below.

In one embodiment, the host is a computing device (e.g., laptop, desktop, smartphone, tablet, digital camera) that includes one or more processors, one or more processor readable storage devices (RAM, ROM, flash memory, hard disk drive, solid state memory) that store processor readable code (e.g., software) for programming the one or more processors to perform the methods described herein. The host may also include additional system memory, one or more input/output interfaces and/or one or more input/output devices in communication with the one or more processors.

Other types of non-volatile memory in addition to NAND flash memory can also be used.

Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse or phase change material, and optionally a steering element, such as a diode or transistor. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND string is an example of a set of series-connected transistors comprising memory cells and SG transistors.

A NAND memory array may be configured so that the array is composed of multiple memory strings in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured. The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-y direction plane) which extends substantially parallel to a major surface of a substrate that supports the memory elements. The substrate may be a wafer over or in which the layer of the memory elements is formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three-dimensional memory array is arranged so that memory elements occupy multiple planes or multiple memory device levels, thereby forming a structure in three dimensions (i.e., in the x, y and z directions, where the z-direction is substantially perpendicular and the x- and y-directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements. The columns may be arranged in a two-dimensional configuration, e.g., in an x-y plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional array of NAND strings, the memory elements may be coupled together to form a NAND string within a single horizontal (e.g., x-y) memory device level. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

In other examples, two-dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

The memory cells of a memory block are typically programmed by applying a voltage differential between a word line of a memory cell and a bit line coupled to the same memory cell, thereby causing electrons to tunnel into the floating gate of that memory cell and causing a threshold voltage of the memory cell to increase. Programming typically occurs sequentially from one word line to another across a memory block or sub-block. In other words, programming occurs with one word line at a time.

An erase operation, on the other hand, involves transitioning the memory cells from their respective programmed data states to the erased state by transferring electrons from the floating gates of the memory cells into the well region and substrate of the chip. During the erase operation, it is desired to lower the threshold voltages Vth of the memory cells below an erase-verify level that represents an upper bound of the erased data state. An erase operation can include a number of erase loops, each including an erase operation (e.g., an erase voltage, or VERA, pulse) followed by an erase verify operation (e.g., an EVFY operation). The erase operation is typically performed on a memory block level (one entire memory block at a time) or on a sub-block level (one sub-block at a time) rather than a word line level, as is the case with programming.

In an erase loop, control circuitry is configured to apply the erase voltage VERA to the strings of the memory block while applying a very low voltage (for example, zero volts) to the word lines of the memory block to provide a positive channel-to-gate voltage for the memory cells of the block to drive electrons out of the charge storing materials of the memory cells, thereby reducing the threshold voltages Vth of the memory cells. The erase voltage VERA or Verase can be applied to the strings either from the bit lines on the drain side of the memory block or from the source lines on the source side of the memory block or from both sides.

FIG. 11A is a table 1100 including exemplary bias conditions during an erase operation in column 1102. Due to capacitive coupling, during the erase operation the bit lines, are raised to a high positive potential (for example, 20 V). A strong electric field is thus applied to the tunnel oxide layers of the memory cells of the selected memory block and the electrons of the floating gate are emitted to the substrate, thereby lowering the threshold voltages of those memory cells.

Figure 11B:
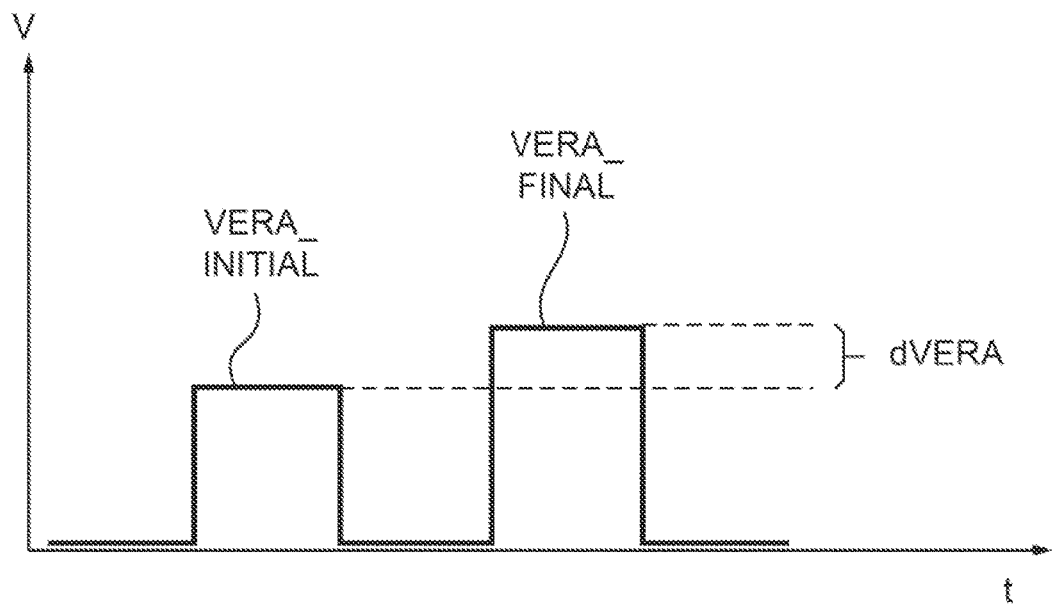
FIG. 11B is a plot of erase voltage vs. time during an example erase operation.

In the verify portion of an erase loop (Column 1104 of Table 1100), an erase verify voltage (0 V in the exemplary embodiment) is applied to the control gates of the memory cells of the memory block and sensing circuitry is used to sense currents in the NAND strings to determine if the memory cells have been sufficiently erased. If an insufficient number of memory cells have been sufficiently erased, then the erase operation proceeds with an additional erase loop to further reduce the threshold voltages Vt of the memory cells being erased. This process is repeated in one or more subsequent erase loops until the erase verify operation passes. Similar to ISPP programming, as described above, the magnitude of the voltage of the erase pulse VERA can increase between erase loops. FIG. 11B depicts a plot of erase voltage vs. time during an example erase operation including a first erase voltage pulse (VERA_INITIAL) and a second erase voltage pulse (VERA_FINAL, or VERA_INITIAL+dVERA).

One important measurement for a NAND memory device is the threshold voltage Vt margin, which is a measurement of the voltage gap between the distributions of data states, such as those illustrated in FIGS. 7-9. An increase in the Vt margin is associated with improved reliability because a greater Vt margin makes it easier for the memory device to identify which data state a memory cell is in during a later read operation. One problem that memory devices sometimes face is commonly known as data retention (DR) degradation in the memory holes, which can result in a loss of Vt margin, thereby leading to an increased failed bit count (FBC).

In some memory devices, the memory holes are divided into two portions that are formed independently of one another and are joined together during a fabrication process. These two portions are an upper memory hole, which is located on a drain side of the memory block, and a lower memory hole, which is located on a source side of the memory block. These different portions may behave differently and, in some cases, the memory cells of the upper memory holes experience greater DR degradation than the memory cells of the lower memory holes. Further, the DR degradation experienced by the upper memory holes gets worse with increased programming and erasing cycling at an increased rate as compared to the lower memory holes, thereby leading to inconsistency between the Vt margin of the memory cells of the upper memory holes and the memory cells of the lower memory holes. Some factors that may cause the difference in DR degradation between the upper and lower memory holes include differences in ON pitch, memory hole shape, MANOS (metal-oxide-nitride-oxide-semiconductor) thickness, and silicon concentration in a charge trapping layer of each memory cell.

Further, different memory strings (which may be referred to herein simply as "strings") may have different erase speeds and therefore some memory strings pass the EVFY operation more quickly than other strings. The EVFY operation determines how many bits (i.e., memory cells) of a memory string have a threshold voltage Vth greater than an EVFY voltage level subsequent to a first VERA pulse. A threshold voltage Vth greater than the EVFY voltage level indicates that the bit did not fully erase. If the number of bits for a given string is greater than (or equal to) an EVFY bit count threshold, then that string did not pass the EVFY operation. Conversely, if the number of bits for the string is less than the EVFY bit count threshold, then that string passed the EVFY operation. Typically, if any strings (e.g., in a memory block or sub-block) do not pass the EVFY operation, an additional VERA pulse is supplied to all strings in the memory block. The additional VERA pulse may be greater than the first VERA pulse by an offset dVERA as described above in FIG. 111B.

Figure 12A:
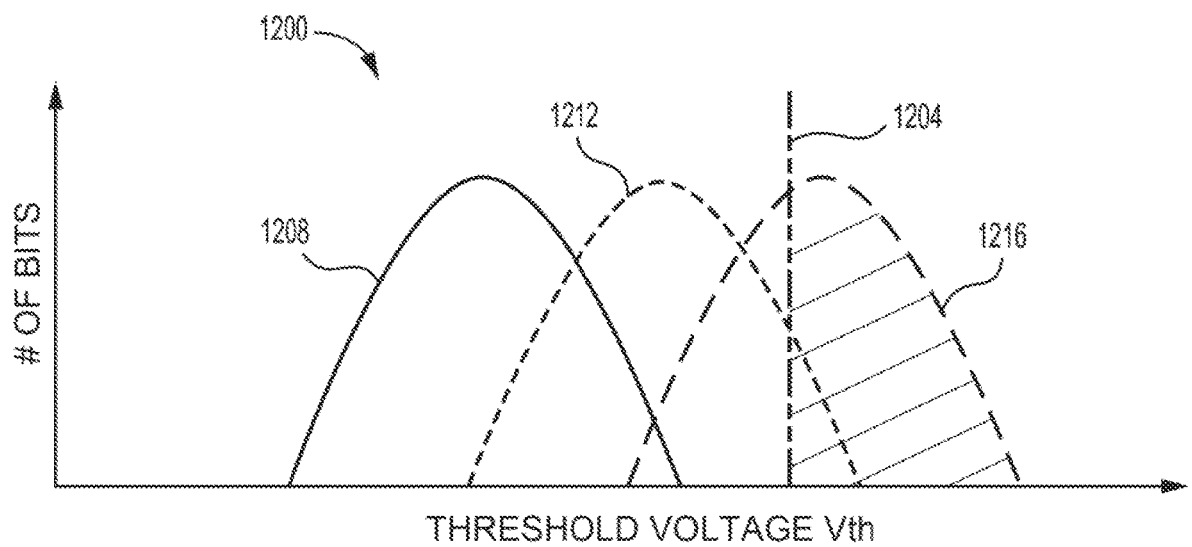
FIG. 12A depicts example voltage distributions of threshold voltages for various strings subsequent to a first VERA pulse in an erase operation.

Some strings may erase (and, therefore, pass the EVFY operation) more quickly than other strings. For example, outer strings may erase more quickly than inner strings, which in turn may erase more quickly than a center string. FIG. 12A depicts voltage distributions 1200 of threshold voltages Vth for various strings subsequent to a first VERA pulse. Each of the voltage distributions 1200 indicates a distribution of threshold voltages Vth for the bits in a corresponding string or set of strings. An area below each of the voltage distributions indicates a total number of bits in the corresponding strings. Accordingly, a portion of any of the distributions 1200 above an EVFY voltage level 1204 indicates a number of bits of that set of strings that have threshold voltages Vth above the EVFY voltage level 1204 subsequent to the first VERA pulse. The number of bits above the EVFY voltage level 1204 is compared to the EVFY bit count threshold to determine whether a given set of strings passed the EVFY operation.

A first voltage distribution 1208 for a first string or set of strings (e.g., a set of outermost strings) is completely below the EVFY voltage level 1204. In other words, the first set of strings passed the EVFY operation after only a single VERA pulse. The first voltage distribution 1208 is indicative of strings having a fast erase speed.

A second voltage distribution 1212 for a second string or set of strings (e.g., a set of inner strings) is mostly below the EVFY voltage level 1204 and has a relatively small portion above the EVFY voltage level 1204. The number of bits below the EVFY voltage level 1204 may still be sufficient to pass the EVFY operation after only the single VERA pulse. The first voltage distribution 1208 is indicative of strings having a moderate erase speed.

A third voltage distribution 1216 for a third string or set of strings (e.g., a center string) is substantially (e.g., more than 50%) above the EVFY voltage level 1204. The third string did not pass the EVFY operation after only the single VERA pulse. The third voltage distribution 1216 is indicative of strings having a slow erase speed.

FIG. 12B depicts voltage distributions 1220 of the threshold voltages Vth for the strings subsequent to a second VERA pulse. In this example, the second VERA pulse was applied to all strings in the memory block (e.g., by increasing a channel bias by dVERA). A first voltage distribution 1224 for the first set of strings is even further below the EVFY voltage level 1204 (i.e., the first voltage distribution 1224 is lower, relative to the EVFY voltage level 1204) with a narrower distribution. A second voltage distribution 1228 for the second set of strings is now completely below the EVFY voltage level 1204 with a narrower distribution. As shown, the second voltage distribution 1228 is slightly wider than the first voltage distribution 1224. A third voltage distribution 1232 for the third string is now also completely below the EVFY voltage level 1204. However, due to the relatively slow erase speed, the third voltage distribution 1232 is still much wider than the first voltage distribution 1224 and the second voltage distribution 1228. Accordingly, the overall distribution of the voltage distributions 1220 is considered to be very wide or large.

FIG. 12C depicts voltage distributions 1240 of the threshold voltages Vth for the strings subsequent to a modified or adapted second VERA pulse according to the present disclosure. For example, the control circuitry of the present disclosure (e.g., the controller 1022, control circuitry 1010, control circuit 1050, and/or a combination thereof) is configured to selectively supply a modified second VERA pulse instead of a full second VERA pulse (e.g., the second VERA pulse supplied prior to the EVFY operation of FIG. 12B). In this example, erase is not performed or otherwise inhibited on selected strings. For example, the erase operation may be performed only on the third string.

In this example, a first voltage distribution 1244 for the first set of strings did not noticeably narrow or shift further below the EVFY voltage level 1204 (i.e., relative to the first voltage distribution 1208 as shown in FIG. 12A). A second voltage distribution 1248 for the second set of strings is now completely below the EVFY voltage level 1204 with a narrower distribution. However, a lower end of the second voltage distribution 1248 did not noticeably shift further below the EVFY voltage level 1204 (i.e., relative to a lower end of the second voltage distribution 1212 as shown in FIG. 12A) while an upper end of the second voltage distribution 1248 shifted below the EVFY voltage level 1204. Accordingly, the second voltage distribution 1248 is narrower than the second voltage distribution 1212.

A third voltage distribution 1252 for the third string is now also completely below the EVFY voltage level 1204. However, the third voltage distribution 1252 is much narrower than the third voltage distribution 1216 or 1232. Accordingly, the overall distribution of the voltage distributions 1240 is much narrower or tighter than the voltage distributions 1220 of FIG. 2B.

Accordingly, systems and methods according to the present disclosure are configured to supply a modified second VERA pulse to selected strings such that additional erase operations are only performed where needed (e.g., on strings that failed the EVFY operation). For example, the erase operation is inhibited for selected strings (e.g., by inhibiting VERA pulse magnitude supplied to the selected strings) as described below in more detail.

Figure 13:
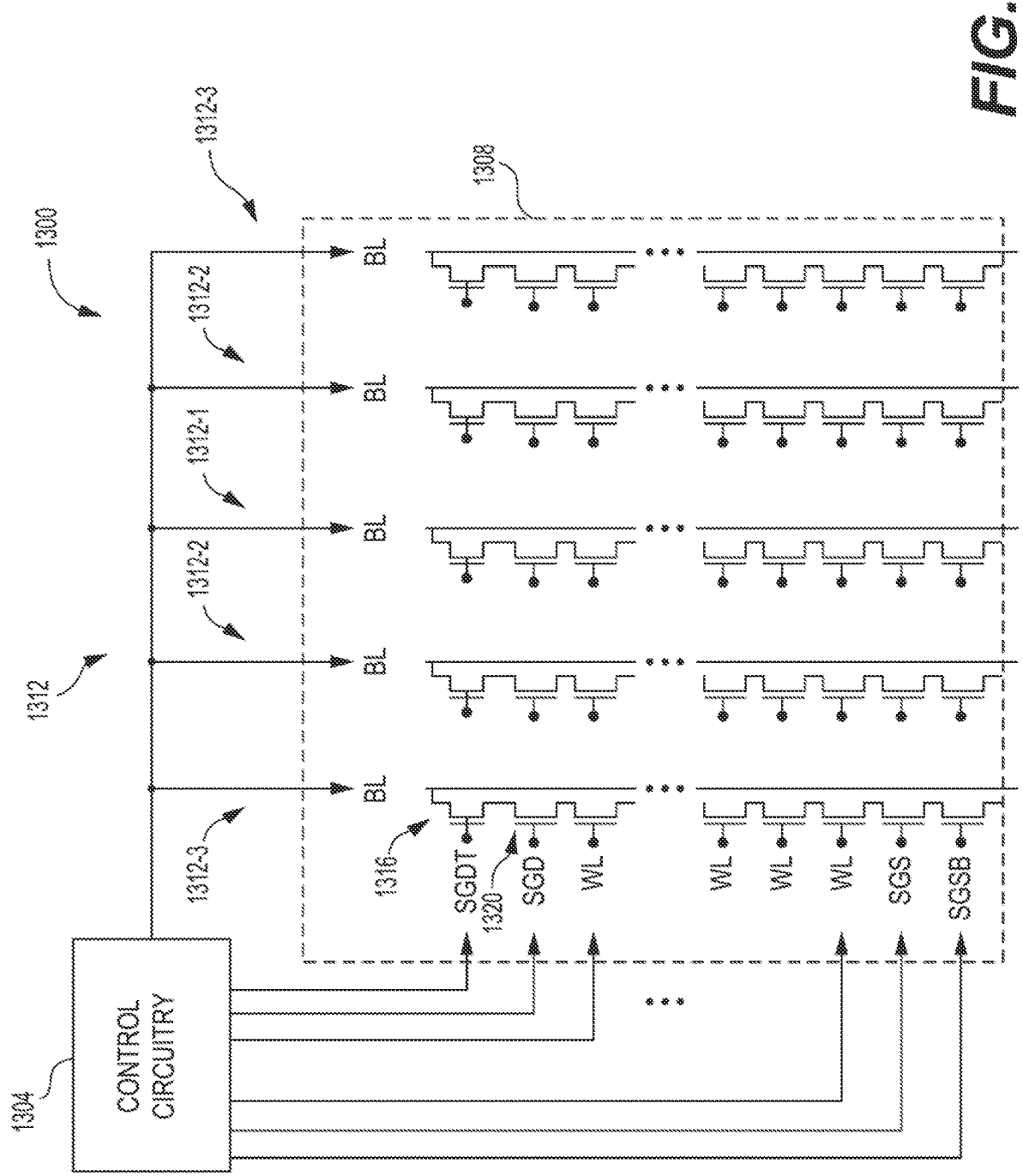
FIG. 13 depicts a system including example control circuitry and a memory block configured to implement the modified second VERA pulse described in FIG. 12C.

FIG. 13 depicts a system 1300 including example control circuitry 1304 and a memory block 1308 including a plurality of strings (e.g., NAND strings) 1312. The control circuitry 1304 according to the present disclosure (e.g., the controller 1022, control circuitry 1010, control circuit 1050, and/or a combination thereof) is configured to selectively control supply of a modified or inhibited VERA pulse to selected strings of the memory block 1308.

For example, the memory block 1308 includes a center string 1312-1, inner strings 1312-2, and outer strings 1312-3 (collectively, strings 1312). Similar to the memory block 100 of FIG. 1, each of the strings 1312 is connected to a respective bit line BL (via at least one select gate transistor, such as drain-side select gate transistors coupled to SGDT and SGD voltages/supply lines) and to at least one source-side select gate transistor (e.g., source-side select gate transistors connected to SGS and SGSB voltages). As shown, each of the strings 1312 includes a first select gate transistor 1316 and a second select gate transistor 1320.

The control circuitry 1304 according to the present disclosure is configured to control respective bias voltages VSGDT applied to the first select gate transistors 1316 to inhibit the magnitude of the VERA pulse applied to the memory cells of the corresponding string. For example, a VERA pulse may be commonly applied to all of the strings 1312 in the memory block 1308. In other words, the system 1300 may not be configured to vary the magnitude of the VERA pulse for individual strings (i.e., the system 1300 is not configured for string-by-string control of the VERA pulse). Instead, the control circuitry 1304 adjusts a bias voltage applied to respective ones of the first select gate transistors 1316 (e.g., via VSGDT). The bias voltage is selected to inhibit the VERA pulse supplied to the corresponding string such that a magnitude of the VERA pulse actually supplied to the memory cells of the string is reduced. In this manner, the system 1300 is configured to prevent an erase operation from being performed on memory cells of selected strings to reduce damage and improve cell reliability.

Figure 14:
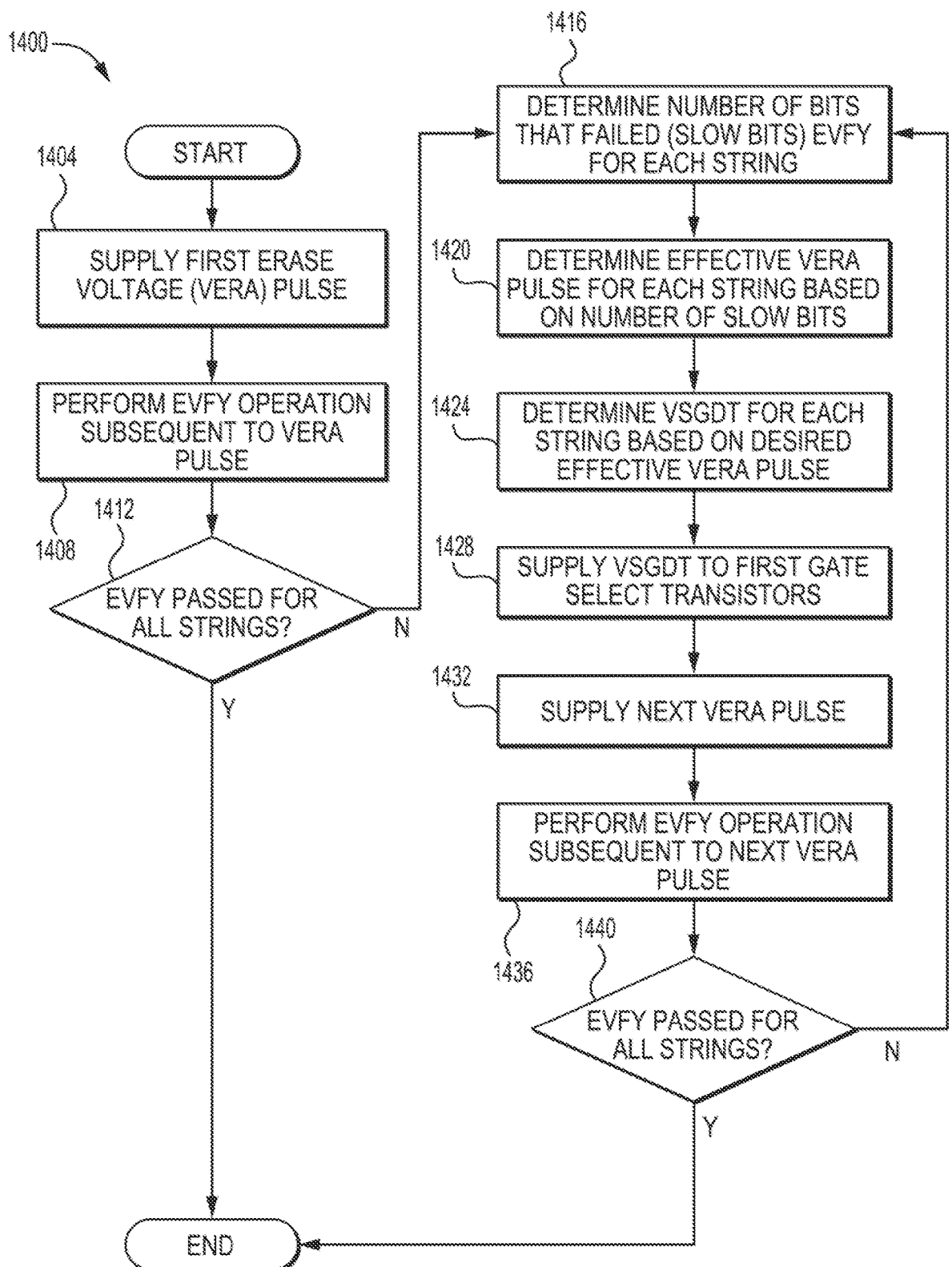
FIG. 14 depicts steps of an example method for modifying a second VERA pulse supplied to selected strings of a memory block.

FIG. 14 depicts steps of an example method 1400 for modifying (e.g., inhibiting a magnitude of) a second VERA pulse supplied to selected strings of a memory block according to the present disclosure. For example, the method 1400 corresponds to an erase operation performed in response to commands from the control circuitry 1304. At 1404, a first VERA pulse is supplied to memory strings of a memory block or memory sub-block. At 1408, the method 1400 performs an EVFY operation. At 1412, the method 1400 determines whether the EVFY operation passed. For example, the method 1400 determines whether the EVFY operation passed for all memory strings in the memory block. If true, the method 1400 (i.e., the erase operation) ends. If false, the method 1400 continues to 1416.

At 1416, the method 1400 counts the number of bits or cells that failed the EVFY operation (i.e., "slow erase bits") for each string (or sets of strings). For example, the method 1400 counts the number of bits that failed for the center string, the number of bits that failed for each string in a set of inner strings, and the number of fits that failed for each string in a set of outer or outermost strings.

At 1420, the method 1400 obtains (e.g., calculates or otherwise determines) a desired VERA magnitude (and, accordingly, a desired dVERA magnitude) for each string for the next VERA pulse based on the respective number of slow bits in each string. The overall desired VERA magnitude corresponds to an effective VERA pulse. In some examples, the method 1400 calculates the desired VERA magnitude. In other examples, the method 1400 calculates the desired dVERA.

For example, the control circuitry 1304 is configured to calculate a respective effective VERA pulse for each string using the number of slow bits for that string. As one example, the control circuitry 1304 calculates the effective VERA pulse using a formula that correlates the number of slow bits, percentage of slow bits, etc. to a corresponding effective VERA pulse. In another example, the control circuitry 1304 implements a lookup table that correlates or indexes the number of slow bits to the effective VERA pulse. In still another example, the control circuitry 1304 may be configured to calculate (or use a lookup table to obtain) respective VSGDT voltages for each string directly using the number of slow bits (i.e., without first obtaining the effective VERA pulse).

In an example, the control circuitry 1304 compares the number of slow bits (a slow bit count, or SBC) to a plurality of slow bit count thresholds (e.g., configurable thresholds SBC1, SBC2, SBC3, etc., where SBC1<SBC2<SBC3) and determines the effective VERA pulse based on the comparisons. For example, an SBC less than SBC1 may indicate that the string passed the EVFY operation. Accordingly, an SBC less than SBC1 may correspond to a completely inhibited VERA pulse (e.g., a low effective VERA pulse, such as 0 V). Conversely, an SBC between SBC1 and SBC2 may correspond to a relatively low effective VERA pulse (e.g., 0.25*VERA, 0.5*VERA, etc.), an SBC between SBC2 and SBC3 may correspond to a moderate effective VERA pulse (e.g., 0.75*VERA), and an SBC greater than SBC3 may correspond to a full (e.g., an uninhibited VERA+dVERA) VERA pulse. In other words, as the SBC increases for respective strings, the control circuitry 1304 decreasingly inhibits the next VERA pulse such that strings with low slow bit counts receive a relatively smaller (or no) effective VERA pulse and strings with high slow bit counts receive a relatively larger effective VERA pulse.

At 1424, the method 1400 obtains the SGDT bias voltage (VSGDT) for each string based on the respective effective VERA pulses (e.g., using a lookup table, such as the same lookup table used in step 1420, a formula that correlates effective VERA pulse voltage to VSGDT, etc.). When applied to a gate of a corresponding one of the first gate select transistors 1316, VSGDT tunes the conductivity of the first gate select transistor 1316 such that the VERA pulse supplied to the bit lines may be modified or adapted for individual strings. For example, a first VSGDT may be applied to the first gate select transistor 1316 of the center string 1312-1 to pass the full VERA pulse, a second VSGDT may be applied to the first gate select transistors 1316 of the inner strings 1312-2 to partially inhibit the VERA pulse, and a third VSGDT may be applied to the first gate select transistors 1316 of the outer strings 1312-3 to fully inhibit the VERA pulse.

In other words, VSGDT may be varied for each of the first gate select transistors 1316 to adjust the effective VERA pulse applied to individual ones of the strings 1312. In this manner, for a next VERA pulse, each of the strings 1312 and their respective memory cells may receive a same or different effective VERA pulse dependent upon the slow bit count for each of the strings 1312 determined in step 1416.

As one example, setting VSGDT to a same voltage as the VERA pulse to maximize inhibition of the VERA pulse. In other words, matching the gate bias voltage of the transistor 1316 to the drain voltage of the transistor 1316 prevents supply of the VERA pulse to the memory cells of the corresponding string. Accordingly, for strings having an SBC below SBC1, VSGDT is set to VERA.

Conversely, for strings having an SBC between SBC1 and SBC2, VSGDT is set to a value to partially inhibit the next VERA pulse. For example, the first gate select transistors 1316 may typically receive a common default voltage (e.g., $VSGDT_{com}$, which may be zero or nonzero). To partially inhibit the next VERA pulse, VSGDT is increased. For example, for the next VERA pulse, VSGDT may be set to $VSGDT_{com}+dVERA*0.75$. For strings having an SBC between SBC2 and SBC3, VSGDT may be set to $VSGDT_{com}+dVERA*0.5$. In other words, VSGDT may be decreased as SBC increases, which in turn causes the effective VERA pulse to increase. For strings having an SBC greater than SBC3, VSGDT is set to $VSGDT_{com}$ so that the full (i.e., uninhibited) VERA pulse (VERA+dVERA) is supplied to the memory cells.

At 1428, the VSGDTs obtained in step 1424 are applied to the first gate select transistors 1316 of the respective strings 1312. At 1432, the next VERA pulse (e.g., VERA+dVERA) is supplied to the strings 1312 via the bit lines. At 1436, the method 1400 performs an EVFY operation. At 1440, the method 1400 determines whether the EVFY operation passed. If true, the method 1400 (i.e., the erase operation) ends. If false, the method 1400 continues to 1416.

Various terms are used herein to refer to particular system components. Different companies may refer to a same or similar component by different names and this description does not intend to distinguish between components that differ in name but not in function. To the extent that various functional units described in the following disclosure are referred to as "modules," such a characterization is intended to not unduly restrict the range of potential implementation mechanisms. For example, a "module" could be implemented as a hardware circuit that includes customized very-large-scale integration (VLSI) circuits or gate arrays, or off-the-shelf semiconductors that include logic chips, transistors, or other discrete components. In a further example, a module may also be implemented in a programmable hardware device such as a field programmable gate array (FPGA), programmable array logic, a programmable logic device, or the like. Furthermore, a module may also, at least in part, be implemented by software executed by various types of processors. For example, a module may comprise a segment of executable code constituting one or more physical or logical blocks of computer instructions that translate into an object, process, or function. Also, it is not required that the executable portions of such a module be physically located together, but rather, may comprise disparate instructions that are stored in different locations and which, when executed together, comprise the identified module and achieve the stated purpose of that module. The executable code may comprise just a single instruction or a set of multiple instructions, as well as be distributed over different code segments, or among different programs, or across several memory devices, etc. In a software, or partial software, module implementation, the software portions may be stored on one or more computer-readable and/or executable storage media that include, but are not limited to, an electronic, magnetic, optical, electromagnetic, infrared, or semiconductor-based system, apparatus, or device, or any suitable combination thereof. In general, for purposes of the present disclosure, a computer-readable and/or executable storage medium may be comprised of any tangible and/or non-transitory medium that is capable of containing and/or storing a program for use by or in connection with an instruction execution system, apparatus, processor, or device.

Similarly, for the purposes of the present disclosure, the term "component" may be comprised of any tangible, physical, and non-transitory device. For example, a component may be in the form of a hardware logic circuit that is comprised of customized VLSI circuits, gate arrays, or other integrated circuits, or is comprised of off-the-shelf semiconductors that include logic chips, transistors, or other discrete components, or any other suitable mechanical and/or electronic devices. In addition, a component could also be implemented in programmable hardware devices such as field programmable gate arrays (FPGA), programmable array logic, programmable logic devices, etc. Furthermore, a component may be comprised of one or more silicon-based integrated circuit devices, such as chips, die, die planes, and packages, or other discrete electrical devices, in an electrical communication configuration with one or more other components via electrical conductors of, for example, a printed circuit board (PCB) or the like. Accordingly, a module, as defined above, may in certain embodiments, be embodied by or implemented as a component and, in some instances, the terms module and component may be used interchangeably.

Where the term "circuit" is used herein, it includes one or more electrical and/or electronic components that constitute one or more conductive pathways that allow for electrical current to flow. A circuit may be in the form of a closed-loop configuration or an open-loop configuration. In a closed-loop configuration, the circuit components may provide a return pathway for the electrical current. By contrast, in an open-looped configuration, the circuit components therein may still be regarded as forming a circuit despite not including a return pathway for the electrical current. For example, an integrated circuit is referred to as a circuit irrespective of whether the integrated circuit is coupled to ground (as a return pathway for the electrical current) or not. In certain exemplary embodiments, a circuit may comprise a set of integrated circuits, a sole integrated circuit, or a portion of an integrated circuit. For example, a circuit may include customized VLSI circuits, gate arrays, logic circuits, and/or other forms of integrated circuits, as well as may include off-the-shelf semiconductors such as logic chips, transistors, or other discrete devices. In a further example, a circuit may comprise one or more silicon-based integrated circuit devices, such as chips, die, die planes, and packages, or other discrete electrical devices, in an electrical communication configuration with one or more other components via electrical conductors of, for example, a printed circuit board (PCB). A circuit could also be implemented as a synthesized circuit with respect to a programmable hardware device such as a field programmable gate array (FPGA), programmable array logic, and/or programmable logic devices, etc. In other exemplary embodiments, a circuit may comprise a network of non-integrated electrical and/or electronic components (with or without integrated circuit devices). Accordingly, a module, as defined above, may in certain embodiments, be embodied by or implemented as a circuit.

It will be appreciated that example embodiments that are disclosed herein may be comprised of one or more microprocessors and particular stored computer program instructions that control the one or more microprocessors to implement, in conjunction with certain non-processor circuits and other elements, some, most, or all of the functions disclosed herein. Alternatively, some or all functions could be implemented by a state machine that has no stored program instructions, or in one or more application-specific integrated circuits (ASICs) or field-programmable gate arrays (FPGAs), in which each function or some combinations of certain of the functions are implemented as custom logic. A combination of these approaches may also be used. Further, references below to a "controller" shall be defined as comprising individual circuit components, an application-specific integrated circuit (ASIC), a microcontroller with controlling software, a digital signal processor (DSP), a field programmable gate array (FPGA), and/or a processor with controlling software, or combinations thereof.

Additionally, the terms "couple," "coupled," or "couples," where may be used herein, are intended to mean either a direct or an indirect connection. Thus, if a first device couples, or is coupled to, a second device, that connection may be by way of a direct connection or through an indirect connection via other devices (or components) and connections.

Regarding, the use herein of terms such as "an embodiment," "one embodiment," an "exemplary embodiment," a "particular embodiment," or other similar terminology, these terms are intended to indicate that a specific feature, structure, function, operation, or characteristic described in connection with the embodiment is found in at least one embodiment of the present disclosure. Therefore, the appearances of phrases such as "in one embodiment," "in an embodiment," "in an exemplary embodiment," etc., may, but do not necessarily, all refer to the same embodiment, but rather, mean "one or more but not all embodiments" unless expressly specified otherwise. Further, the terms "comprising," "having," "including," and variations thereof, are used in an open-ended manner and, therefore, should be interpreted to mean "including, but not limited to . . . " unless expressly specified otherwise. Also, an element that is preceded by "comprises . . . a" does not, without more constraints, preclude the existence of additional identical elements in the subject process, method, system, article, or apparatus that includes the element.

The terms "a," "an," and "the" also refer to "one or more" unless expressly specified otherwise. In addition, the phrase "at least one of A and B" as may be used herein and/or in the following claims, whereby A and B are variables indicating a particular object or attribute, indicates a choice of A or B, or both A and B, similar to the phrase "and/or." Where more than two variables are present in such a phrase, this phrase is hereby defined as including only one of the variables, any one of the variables, any combination (or sub-combination) of any of the variables, and all of the variables.

Further, where used herein, the term "about" or "approximately" applies to all numeric values, whether or not explicitly indicated. These terms generally refer to a range of numeric values that one of skill in the art would consider equivalent to the recited values (e.g., having the same function or result). In certain instances, these terms may include numeric values that are rounded to the nearest significant figure.

In addition, any enumerated listing of items that is set forth herein does not imply that any or all of the items listed are mutually exclusive and/or mutually inclusive of one another, unless expressly specified otherwise. Further, the term "set," as used herein, shall be interpreted to mean "one or more," and in the case of "sets," shall be interpreted to mean multiples of (or a plurality of) "one or more," "ones or more," and/or "ones or mores" according to set theory, unless expressly specified otherwise.

The foregoing detailed description has been presented for purposes of illustration and description. It is not intended to be exhaustive or be limited to the precise form disclosed. Many modifications and variations are possible in light of the above description. The described embodiments were chosen to best explain the principles of the technology and its practical application to thereby enable others skilled in the art to best utilize the technology in various embodiments and with various modifications as are suited to the particular use contemplated. The scope of the technology is defined by the claims appended hereto.

What is claimed is:

1. A memory device, comprising:
a memory block comprising a plurality of memory strings each comprising a plurality of memory cells; and
control circuitry configured to (i) perform an erase operation to erase the memory cells of each of the plurality of memory strings and (ii) perform an erase verify operation to verify whether the memory cells of each of the plurality of memory strings were sufficiently erased during the erase operation, wherein, to perform the erase operation, the control circuitry is configured to supply a first erase voltage pulse,
perform the erase verify operation subsequent to supplying the first erase voltage pulse and determine a number of memory cells of each of the plurality of memory strings that did not pass the erase verify operation,
subsequent to the erase verify operation, supply bias voltages including a first bias voltage to a first one of the plurality of memory strings and a second bias voltage to a second one of the plurality of memory strings, wherein the second bias voltage is different than the first bias voltage, and wherein the first and second bias voltages are based on the number of memory cells of each of the plurality of memory strings that did not pass the erase verify operation, and
while supplying the first and second bias voltages, supply a second erase voltage pulse, wherein the second bias voltage supplied to the second one of the plurality of memory strings is configured to inhibit the second erase voltage pulse supplied to the memory cells of the second one of the plurality of memory strings.

2. The memory device of claim 1, wherein the second erase voltage pulse has a greater magnitude than the first erase voltage pulse.

3. The memory device of claim 1, wherein, to determine the first and second bias voltages, the control circuitry is configured to (i) compare the number of memory cells of each of the plurality of memory strings that did not pass the erase verify operation to at least one threshold and (ii) determine the first and second bias voltages based on the comparison.

4. The memory device of claim 3, wherein the control circuitry is configured to (i) select the first bias voltage in response to the number of memory cells for the first one of the plurality of memory strings that did not pass the erase verify operation being greater than the at least one threshold and (ii) select the second bias voltage in response to the number of memory cells for the second one of the plurality of memory strings that did not pass the erase verify operation being less than the at least one threshold.

5. The memory device of claim 1, wherein the control circuitry is configured to (i) determine desired effective second erase voltage pulses for each of the plurality of memory strings based on the number of memory cells for each of the plurality of memory strings that did not pass the erase verify operation and (ii) determine the first and second bias voltages based on the desired effective second erase voltages.

6. The memory device of claim 5, wherein the control circuitry is configured to retrieve the first and second bias voltages from a lookup table that indexes the number of memory cells for each of the plurality of memory strings that did not pass the erase verify operation to at least one of (i) the desired effective second erase voltages and (ii) the first and second bias voltages.

7. The memory device of claim 1, wherein each of the plurality of memory strings includes a select gate transistor, and wherein the control circuitry is configured to supply the bias voltages to respective ones of the select gate transistors.

8. The memory device of claim 7, wherein the control circuit is configured to supply the bias voltages to the select gate transistors to inhibit the second erase voltage pulse.

9. A method of operating a memory device including a memory block, the memory block including a plurality of memory strings each including a plurality of memory cells, the method comprising:
performing an erase operation to erase the memory cells of each of the plurality of memory strings; and
performing an erase verify operation to verify whether the memory cells of each of the plurality of memory strings were sufficiently erased during the erase operation,
wherein, to perform the erase operation, the method includes
supplying a first erase voltage pulse,
performing the erase verify operation subsequent to supplying the first erase voltage pulse and determining a number of memory cells of each of the plurality of memory strings that did not pass the erase verify operation,
subsequent to the erase verify operation, supplying bias voltages including a first bias voltage to a first one of the plurality of memory strings and a second bias voltage to a second one of the plurality of memory strings, wherein the second bias voltage is different than the first bias voltage, and the first and second bias voltages being based on the determined number of memory cells of each of the plurality of memory strings that did not pass the erase verify operation, and
while supplying the first and second bias voltages, supplying a second erase voltage pulse, wherein the second bias voltage supplied to the second one of the plurality of memory strings is configured to inhibit the second erase voltage pulse supplied to the memory cells of the second one of the plurality of memory strings.

10. The method of claim 9, wherein the second erase voltage pulse has a greater magnitude than the first erase voltage pulse.

11. The method of claim 9, wherein, to determine the first and second bias voltages, the method further comprises:
comparing the number of memory cells of each of the plurality of memory strings that did not pass the erase verify operation to at least one threshold; and
determining the first and second bias voltages based on the comparison.

12. The method of claim 11, further comprising:
selecting the first bias voltage in response to the number of memory cells for the first one of the plurality of memory strings that did not pass the erase verify operation being greater than the at least one threshold; and
selecting the second bias voltage in response to the number of memory cells for the second one of the plurality of memory strings that did not pass the erase verify operation being less than the at least one threshold.

13. The method of claim 9, further comprising:
determining desired effective second erase voltage pulses for each of the plurality of memory strings based on the number of memory cells for each of the plurality of memory strings that did not pass the erase verify operation; and
determining the first and second bias voltages based on the desired effective second erase voltages.

14. The method of claim 13, further comprising:
retrieving the first and second bias voltages from a lookup table that indexes the number of memory cells for each of the plurality of memory strings that did not pass the erase verify operation to at least one of (i) the desired effective second erase voltages and (ii) the first and second bias voltages.

15. The method of claim 9, wherein each of the plurality of memory strings includes a select gate transistor, the method further comprising supplying the bias voltages to respective ones of the select gate transistors.

16. The method of claim 15, further comprising supplying the bias voltages to the select gate transistors to inhibit the second erase voltage pulse.

17. A memory device, comprising:
a memory block comprising a plurality of memory strings each comprising a plurality of memory cells; and
control means for (i) performing an erase operation to erase the memory cells of each of the plurality of memory strings and (ii) performing an erase verify operation to verify whether the memory cells of each of the plurality of memory strings were sufficiently erased during the erase operation, wherein, to perform the erase operation, the control means
supplies a first erase voltage pulse,
performs the erase verify operation subsequent to supplying the first erase voltage pulse and determines a number of memory cells of each of the plurality of memory strings that did not pass the erase verify operation,
subsequent to the erase verify operation, supplies bias voltages including a first bias voltage to a first one of the plurality of memory strings and a second bias voltage to a second one of the plurality of memory strings, wherein the second bias voltage is different than the first bias voltage, and wherein the first and second bias voltages are based on the determined number of memory cells of each of the plurality of memory strings that did not pass the erase verify operation, and while supplying the first and second bias voltages, supplies a second erase voltage pulse, wherein the second bias voltage supplied to the second one of the plurality of memory strings is configured to inhibit the second erase voltage pulse supplied to the memory cells of the second one of the plurality of memory strings.

18. The memory device of claim 17, wherein the control means (i) determines a number of memory cells of each of the plurality of memory strings that did not pass the erase verify operation and (ii) determines the first and second bias voltages based on the determined number of memory cells of each of the plurality of memory strings that did not pass the erase verify operation.

* * * * *